(12) United States Patent
Aulich et al.

(10) Patent No.: US 11,905,382 B2
(45) Date of Patent: Feb. 20, 2024

(54) PROTON-EXCHANGE MEMBRANE

(71) Applicants: North Dakota State University, Fargo, ND (US); Energy and Environmental Research Center Foundation, Grand Forks, ND (US)

(72) Inventors: Ted R. Aulich, Grand Forks, ND (US); Jivan Thakare, Grand Forks, ND (US); John Hurley, Grand Forks, ND (US); Xiangfa Wu, Fargo, ND (US); Zhengping Zhou, Fargo, ND (US); Oksana Zholobko, Fargo, ND (US)

(73) Assignee: Energy and Environmental Research Center Foundation, Grand Forks, ND (US)

(*) Notice: Subject to any disclaimer, the term of this patent is extended or adjusted under 35 U.S.C. 154(b) by 897 days.

(21) Appl. No.: 16/922,160

(22) Filed: Jul. 7, 2020

(65) Prior Publication Data

US 2021/0009775 A1  Jan. 14, 2021

Related U.S. Application Data

(60) Provisional application No. 62/871,511, filed on Jul. 8, 2019, provisional application No. 63/030,512, filed on May 27, 2020.

(30) Foreign Application Priority Data

May 20, 2020  (UA) ............... a 2020 03014

(51) Int. Cl.
*C08J 5/22* (2006.01)
*C08J 5/06* (2006.01)
(Continued)

(52) U.S. Cl.
CPC ............ *C08J 5/2218* (2013.01); *C08J 5/046* (2013.01); *C08J 5/06* (2013.01); *C08K 3/20* (2013.01); *C08K 3/32* (2013.01); *C08K 7/04* (2013.01); *D01D 5/003* (2013.01); *D01D 10/02* (2013.01); *D04H 1/4326* (2013.01); *D04H 1/728* (2013.01); *D04H 1/74* (2013.01); *B82Y 30/00* (2013.01); *B82Y 40/00* (2013.01); *C08J 2379/04* (2013.01); *C08K 2003/321* (2013.01); *C08K 2201/011* (2013.01)

(58) Field of Classification Search
USPC .......................................................... 521/27
See application file for complete search history.

(56) References Cited

U.S. PATENT DOCUMENTS 6,042,958 A * 3/2000 Denton ................. H01M 8/106
429/492

OTHER PUBLICATIONS

Sun et al, "High temperature proton exchange membranes based on cerium sulfophenyl phosphate doped polybenzimidazole by end-group protection and hot-pressing method," International Journal of Hydrogen Energy 42 (2017) 486-495. (Year: 2017).*

(Continued)

*Primary Examiner* — Fred M Teskin
(74) *Attorney, Agent, or Firm* — Schwegman Lundberg & Woessner, P.A.

(57) ABSTRACT

A proton-exchange membrane includes a polymer matrix, polymer fibers, or a combination thereof. The proton-exchange membrane also includes a proton-conducting material distributed on the polymer matrix, on the polymer fibers, in the polymer fibers, or a combination thereof.

18 Claims, 12 Drawing Sheets

(51) Int. Cl.
*C08K 3/20* (2006.01)
*C08K 3/32* (2006.01)
*C08K 7/04* (2006.01)
*D01D 5/00* (2006.01)
*D01D 10/02* (2006.01)
*D04H 1/74* (2006.01)
*D04H 1/728* (2012.01)
*D04H 1/4326* (2012.01)
*C08J 5/04* (2006.01)
*B82Y 40/00* (2011.01)
*B82Y 30/00* (2011.01)

(56) References Cited

OTHER PUBLICATIONS

Gong et al, "High level of solid superacid coated poly(vinylidene fluoride) electrospun nanofiber composite polymer electrolyte membranes," Journal of Membrane Science 535 (2017) 113-121. (Year: 2017).*

Ma et al, "Investigations on high performance proton exchange membrane water electrolyzer," International Journal of Hydrogen Energy 34 (2009) 678-684. (Year: 2009).*

* cited by examiner

# PROTON-EXCHANGE MEMBRANE

CROSS-REFERENCE TO RELATED APPLICATIONS

This application claims the benefit of priority to U.S. Provisional Patent Application Ser. No. 62/871,511 filed Jul. 8, 2019, Ukrainian Application No. 202003014 filed May 20, 2020, and U.S. Provisional Patent Application Ser. No. 63/030,512 filed May 27, 2020, the disclosures of which are incorporated herein in their entirety by reference.

STATEMENT OF GOVERNMENT SUPPORT

This invention was made with Government support under DE-EE0008324 awarded by the Department of Energy, and under R-036-45 awarded by the North Dakota Industrial Commission. The U.S. Government has certain rights in this invention.

BACKGROUND

Proton-exchange membranes can be used in electrolytic cells, such as for ammonia production, water electrolysis for hydrogen production, and fuel cells. However, currently available proton-exchange membranes are limited to an operating temperature of about 160-180° C., which limits their usefulness for high-temperature applications.

SUMMARY OF THE INVENTION

In various embodiments, the present invention provides a proton-exchange membrane. The membrane includes a polymer matrix, polymer fibers, or a combination thereof. The membrane also includes a proton-conducting material distributed in the polymer matrix, on the polymer fibers, in the polymer fibers, or a combination thereof.

In various embodiments, the present invention provides a proton-exchange membrane. The membrane includes a polymer matrix including polybenzimidazole (PBI). The membrane also includes proton-conducting nanofibers distributed in the polymer matrix. Each nanofiber is aligned perpendicularly to a plane of the membrane. Each nanofiber includes a core that is continuous along a length of the nanofiber and that includes a proton-conducting inorganic material, the proton-conducting inorganic material including an alkali thio-hydroxogermanate (ATHG), an ultraphosphate, a pyrophosphate, or a combination thereof. Each nanofiber also includes a shell that is continuous along the length of the nanofiber, the shell including polybenzimidazole (PBI). Each nanofiber is continuous from one major face of the membrane to another major face of the membrane.

In various embodiments, the present invention provides a proton-exchange membrane including a polymer matrix including polybenzimidazole (PBI). The membrane also includes proton-conducting nanofibers distributed in the polymer matrix. Each nanofiber includes a core that is continuous along a length of the nanofiber and that includes a proton-conducting inorganic material, the proton-conducting inorganic material including an alkali thio-hydroxogermanate (ATHG), an ultraphosphate, a pyrophosphate, or a combination thereof. Each nanofiber also includes a shell that is continuous along the length of the nanofiber, the shell including polybenzimidazole (PBI).

In various embodiments, the present invention provides a proton-exchange membrane including a polymer matrix including polybenzimidazole (PBI). The membrane also includes particles including a proton-conducting material homogeneously distributed in the polymer matrix. The proton-conducting material includes an alkali thio-hydroxogermanate (ATHG), an ultraphosphate, a pyrophosphate, or a combination thereof.

In various embodiments, the present invention provides a proton-exchange membrane including polymer fibers including polybenzimidazole (PBI). The membrane also includes a proton-conducting material distributed on the polymer fibers, wherein the proton-conducting material includes an alkali thio-hydroxogermanate (ATHG), an ultraphosphate, a pyrophosphate, or a combination thereof. The polymer fibers having the proton-conducting material thereon are matted together in an orientation that is substantially parallel to a plane of the membrane.

In various embodiments, the present invention provides a proton-exchange membrane including polymer fibers including polybenzimidazole (PBI). The membrane also includes particles including a proton-conducting material homogeneously distributed in the polymer fibers, the proton-conducting material including an alkali thio-hydroxogermanate (ATHG), an ultraphosphate, a pyrophosphate, or a combination thereof. The polymer fibers having the proton-conducting material thereon are matted together in an orientation that is substantially parallel to a plane of the membrane.

In various embodiments, the present invention provides an ammonia-forming apparatus, a water-electrolysis apparatus, or an electrochemical cell including an embodiment of the membrane. For example, the electrochemical cell can include an anode, a cathode, and the membrane separating the anode and the cathode. The electrochemical cell can be a fuel cell.

In various embodiments, the present invention provides a method of using an embodiment of the membrane, the method including conducting protons from a major face of the membrane to another major face of the membrane with a conductivity of $10^{-6}$ S/cm to about $10^{-1}$ S/cm while the membrane is at a temperature of $\geq 200$ to $\leq 450°$ C.

In various embodiments, the present invention provides a method of using an embodiment of the membrane, the method including conducting protons from one of the major faces of the membrane to the other major face with a conductivity of $5 \times 10^{-5}$ S/cm to about $1 \times 10^{-1}$ S/cm while the membrane is at a temperature of $\geq 200$ to $\leq 450°$ C.

In various embodiments, the present invention provides a method of making an embodiment of the membrane. The method includes co-electrospinning a solution including the proton-conducting inorganic material and a solution including a heat-resistant polymer to form core-shell nanofibers including a core that includes the proton-conducting inorganic material and including a polymer shell that has the same or different composition as the polymer matrix. The method also includes heat pressing the nanofibers to form the membrane.

In various embodiments, the present invention provides a method of making an embodiment of the membrane. The method includes forming core-shell nanofibers including a core and shell, the forming including electrospinning a heat-resistant polymer to form the core including a polymer that has the same or different composition as the polymer matrix, and electrospray coating the core or solution dipping the core to form the shell including the proton-conducting inorganic material. The method also includes heat pressing the nanofibers to form the membrane.

In various embodiments, the present invention provides a method of making an embodiment of the membrane. The method includes combining a polymer solution and particles including the proton-conducting material to form a mixture. The method includes drying the mixture. The method includes pulverizing the dried mixture. The method optionally includes further processing the dried mixture including adding a polymer solution to the dried mixture, drying the resulting mixture, and pulverizing the resulting dried mixture. The method includes adding a solvent to the dried mixture to form a dough. The method also includes pressing the dough to form the membrane.

In various embodiments, the present invention provides a method of making an embodiment of the membrane. The method includes combining a polymer solution and a suspension of particles including the proton-conducting material to form a mixture. The method includes applying the mixture to a flat surface. The method also includes drying the mixture on the flat surface to form the membrane.

In various embodiments, the present invention provides a method of making an embodiment of the membrane. The method includes combining a polymer solution and a suspension of particles comprising the proton-conducting material to form a mixture. The method includes electrospinning the mixture to form polymer fibers comprising particles therein, the particles including the proton-conducting material. The method also includes heat pressing the polymer fibers into a mat, to form the membrane.

In various embodiments, the present invention provides a method of forming ammonia using an embodiment of the membrane. The method includes generating ammonia from a cathode of an ammonia-production cell. The ammonia-production cell includes an anode, the cathode, and the membrane, wherein the membrane separates the anode and the cathode.

In various embodiments, the present invention provides a method of water electrolysis using an embodiment of the membrane. The method includes generating hydrogen from a cathode of an electrolysis cell. The electrolysis cell includes an anode, the cathode, the membrane, wherein the membrane separates the anode and the cathode.

In various embodiments, the present invention provides a method of operating an electrochemical cell including an embodiment of the membrane. The method includes generating an electrical potential between an anode and a cathode of the electrochemical cell. The electrochemical cell includes the anode, the cathode, and the membrane, wherein the membrane separates the anode and the cathode.

In various embodiments, the proton-conducting membrane of the present invention has certain advantages over other membranes, at least some of which are unexpected. For example, in various embodiments, the proton-exchange membrane of the present invention can be used at higher temperatures than other membranes while maintaining high proton-conductivity and high durability. In various embodiments, the proton-exchange membrane of the present invention can have higher proton conductivity than other membranes at a given temperature. In various embodiments, the proton-exchange membrane of the present invention can have higher proton conductivity at a temperature above 200° C. than other membranes. In various embodiments, the proton-exchange membrane of the present invention can be used for ammonia production, water electrolysis, or fuel cell operation at a temperature above 200° C. with greater efficiency than other membranes. In various embodiments, the proton-exchange membrane of the present invention can be used to generate ammonia at higher temperature and lower pressure, for water electrolysis to generate hydrogen at higher temperatures, and for fuel cell operation at higher temperatures, as compares to other membranes.

In various embodiments, the proton-conducting membrane of the present invention provides low gas permeability, high proton conductivity, and high durability at a temperature of 200-450° C., 200-400° C., or 300-350° C. These properties can enable use of the membrane for electrolytic ammonia production, high-temperature improved-efficiency water electrolysis (for high-purity hydrogen production), and other high-temperature electrochemical applications that require high proton conductivity with low gas permeability.

Achieving a meaningful ammonia synthesis rate requires a temperature of at least 300° C., but at temperatures exceeding 450° C., equilibrium-driven ammonia decomposition occurs at a faster rate than ammonia synthesis. Versus low-temperature electrolysis, high-temperature electrolysis (e.g., 300° C.) offers improved kinetics (translating to higher electrical efficiency/reduced electricity consumption and reduced cost per unit hydrogen), increased current density and lower cell potential (further cost reduction), and the ability to use gray/salt water (input water is converted to steam) without the material degradation challenges associated with high-temperature (600-1000° C.) electrolysis. Polymer-based PEMs utilized in commercially available PEM fuel cells are limited to an operating temperature of about 70-100° C., which means they are susceptible to catalyst poisoning by carbon monoxide (CO). An operational temperature of at least 200° C. would eliminate the threat of catalyst poisoning.

In various embodiments, the proton-conducting membrane of the present invention can be resistant to thermal degradation (e.g., at up to at least 300° C. or 450° C.), can retain durability under high-humidity and high-temperature conditions, can be insoluble in water and can have low hygroscopic character allowing long-term use under high-humidity conditions, low gas permeability, or a combination thereof. These properties can enable use of the membrane for electrolytic ammonia production, high-temperature improved-efficiency water electrolysis (e.g., for high-purity hydrogen production), and other high-temperature electrochemical applications that require high proton conductivity with low gas permeability.

BRIEF DESCRIPTION OF THE FIGURES

The drawings illustrate generally, by way of example, but not by way of limitation, various embodiments of the present invention.

FIG. 3B is a zoomed-in view of a portion of FIG. 3A.

FIG. 4B is a zoomed-in view of a portion of FIG. 4A.

DETAILED DESCRIPTION OF THE INVENTION

Figure 1A:
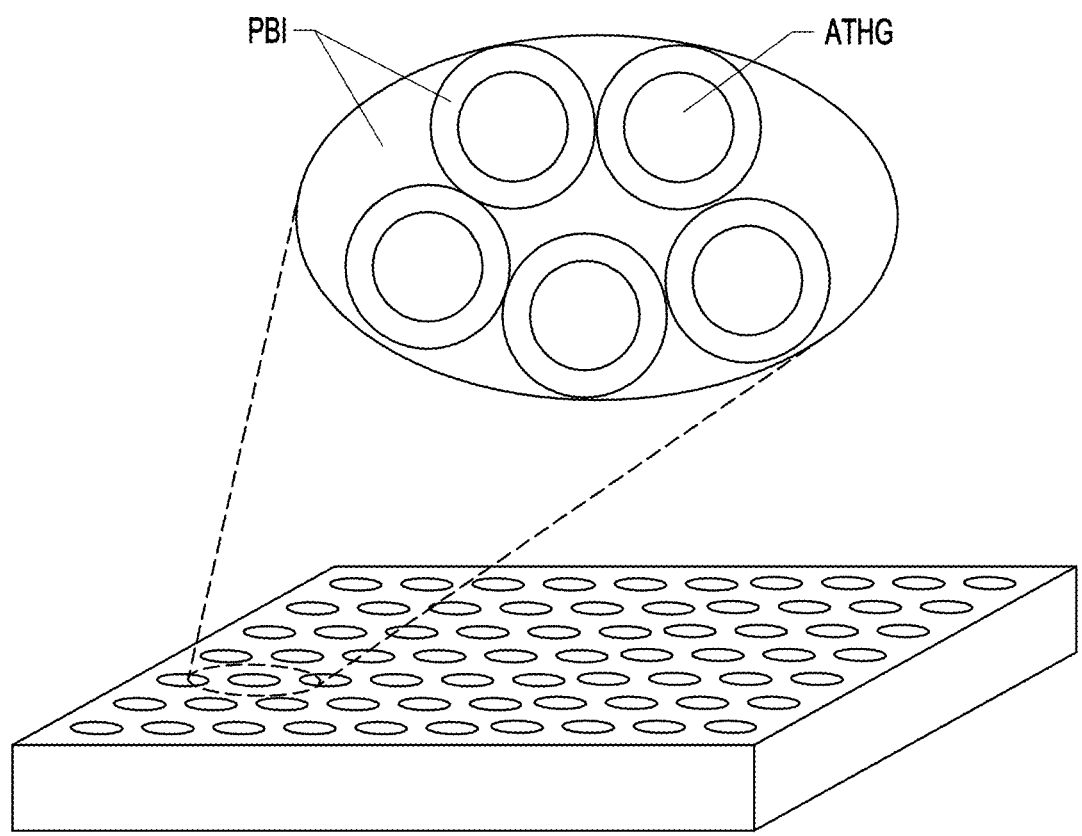
FIG. 1A illustrates a membrane including core-shell ATHG-PBI nanofibers contained within and perpendicularly aligned to the plane of a PBI matrix, in accordance with various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

Proton-Exchange Membrane.

In various embodiments, the present invention provides a proton-exchange membrane. The proton-exchange membrane can include a polymer matrix, polymer fibers, or a combination thereof. The proton-exchange membrane can also include a proton-conducting material distributed in the polymer matrix, on the polymer fibers, in the polymer fibers, or a combination thereof. The membrane is proton-conductive from one major face to the other major face. The membrane can be flexible, gas-impermeable, liquid-impermeable, and electrically insulating.

In some embodiments, the proton-exchange membrane includes nanofibers including the proton-conducting material distributed in a polymer matrix, wherein the nanofibers can be aligned perpendicular to the membrane or in a nonwoven mat having the nanofibers oriented substantially parallel to the plane of the membrane; such embodiments can be substantially free of polymer fibers and particles including the proton-conducting material. In some embodiments, the proton-exchange membrane includes particles including the proton-conducting material homogeneously distributed in a polymer matrix, such that the proton-exchange membrane is a composite of the polymer matrix and the proton-conducting material; such embodiments can be substantially free of polymer fibers and nanofibers including the proton-conducting material. In some embodiments, the proton-exchange membrane includes polymer fibers that are coated with the proton-conductive material (e.g., as a coating of particulates including the proton-conductive material homogeneously distributed thereon), wherein the polymer fibers can be in a nonwoven mat having the fibers oriented substantially parallel to the plane of the membrane; such embodiments can be substantially free of a polymer matrix and nanofibers including the proton-conducting material. In some embodiments, the proton-exchange membrane includes polymer fibers having particles including the proton-conductive material homogeneously distributed therein, wherein the polymer fibers can be in a nonwoven mat having the fibers oriented substantially parallel to the plane of the membrane; such embodiments can be substantially free of a polymer matrix and nanofibers including the proton-conducting material.

The membrane can have any suitable thickness (e.g., distance from one major face to the other major face), such as about 100 nm to about 1 cm, about 0.001 cm to about 0.05 cm, or about 100 nm or less, or less than, equal to, or greater than 150 nm, 200, 250, 300, 350, 400, 450, 500, 600, 700, 800, 900 nm, 0.0001 cm, 0.0005, 0.001, 0.005, 0.01, or about 0.05 cm or more. The membrane can have a uniform thickness or can have an uneven thickness. The membrane can have any suitable surface area, such as wherein a major face of the membrane has an area of about 0.0001 cm$^2$ to about 1,000 m$^2$, about 1 cm$^2$ to about 10 cm$^2$, or about 0.0001 cm$^2$ or less, or less than, equal to, or greater than about 0.0005 cm$^2$, 0.001, 0.005, 0.01, 0.05, 0.1, 0.5, 1, 5, 10, 50, 100, 500 cm$^2$, 0.1 m$^2$, 0.5, 1, 5, 10, 50, 100, 500, or 1,000 m$^2$ or more.

The membrane can have any suitable proton conductivity, such as measured using the procedure described in the Examples. For example, the membrane can have a proton conductivity from one major face to the other major face of at least about 10$^{-4}$ S/cm, at least 10$^{-3}$ S/cm, at least 10$^{-2}$ S/cm, about 10$^{-6}$ S/cm to about 10$^{-4}$ S/cm, 5×10$^{-5}$ S/cm to about 1×10$^{-4}$ S/cm, or about 10$^{-6}$ or less, or less than, equal to, or greater than 5×10$^{-6}$, 1×10$^{-5}$, 5×10$^{-5}$, 1×10$^{-4}$, 2×10$^{-4}$, 4×10$^{-4}$, 6×10$^{-4}$, 8×10$^{-4}$, 1×10$^{-3}$, 2×10$^{-3}$, 4×10$^{-3}$, 6×10$^{-3}$, 8×10$^{-3}$, 1×10$^{-2}$, 2×10$^{-2}$, 4×10$^{-2}$, 5×10$^{-2}$, 8×10$^{-2}$, or about 1×10$^{-1}$ or more. The proton conductivity of the membrane can be sustainable (e.g., for 30 minutes, an hour, a day, a week, a month, a year, or more, or indefinitely) at temperatures of ≥450° C., ≥400° C., ≥350° C., ≥300° C., ≥200° C., ≥200 to ≤450° C., ≥200 to ≤400° C., ≥200 to ≤350° C., ≥200 to ≤300° C., or 200° C. or less, or less than, equal to, or greater than 210° C., 220, 230, 240, 250, 260, 270, 280, 290, 300, 310, 320, 330, 340, 350, 360, 370, 380, 390, 400, 410, 420, 430, 440° C., or 450° C. or more. The proton conductivity can be achieved under any suitable humidity conditions, such as with a humidity of about 0 g/m$^3$ to about 3,000 g/m$^3$, 200 g/m$^3$ to 1,000 g/m$^3$, 650 g/m$^3$ to 1350 g/m$^3$, or about 0 g/m$^3$ or more, or less than, equal to, or greater than 10 g/m$^3$, 15, 20, 25, 50, 75, 100, 125, 150, 175, 200, 250, 300, 350, 400, 450, 500, 550, 600, 650, 700, 750, 800, 850, 900, 950, 1,000, 1,050, 1,100, 1,150, 1,200, 1,250, 1,300, 1,400, 1,500, 1,600, 1,800, 2,000, or 2,500 g/m$^3$, or about 3,000 g/m$^3$ or less.

Polymer Matrix or Polymer Fibers.

The proton-conducting membrane can include a polymer matrix, polymer fibers, or a combination thereof. The polymer matrix or polymer fibers, or the polymer thereof, can have lower proton conductivity than the proton-conducting material. The polymer matrix or polymer fibers, or the polymer thereof, can be protonically-insulating or can be proton conductive. The polymer matrix or polymer fibers, or the polymer thereof, can be substantially non-conductive to protons. The polymer matrix or polymer fibers can include a heat resistant synthetic polymer. The heat-resistant synthetic polymer can be about 20 wt % to about 100 wt % of the polymer matrix, polymer fibers, or combination thereof, about 20 wt % to about 50 wt %, about 95 wt % to about 100 wt %, or about 50 wt % or less, or less than equal to, or greater than about 22 wt %, 24, 26, 28, 30, 32, 34, 36, 38, 40, 42, 44, 46, 48, 50, 52, 54, 56, 58, 60, 65, 70, 75, 80, 82, 84, 86, 88, 90, 91, 92, 93, 94, 95, 96, 97, 98, 99, 99.5, 99.9, 99.99, or about 99.999 wt % or more. The heat-resistant polymer can be any suitable heat-resistant polymer, such as a polyimide, a polybenzoxazole, a polybenzimidazole, a polybenzthiazole, a ladder polymer, a polymer including cyclotriphosphazene, a polysialate, or a combination thereof. The heat-resistant polymer can be polybenzimidazole (PBI), such as a PBI homopolymer, a PBI copolymer, or a combination thereof.

The polymer matrix, polymer fibers, or combination thereof, can form any suitable proportion of the membrane. For example, the polymer matrix, polymer fibers, or combination thereof can be about 0.01 wt % to about 99 wt % of the membrane, about 5 wt % to about 80 wt %, or about 0.01 wt % or more, or less than, equal to, or greater than about 0.05 wt %, 0.1, 0.2, 0.4, 0.6, 0.8, 1, 1.5, 2, 3, 4, 5, 6, 8, 10, 15, 20, 25, 30, 35, 40, 45, 50, 55, 60, 65, 70, 75, 80, 85, 90, 91, 92, 93, 94, 95, 96, 97, or 98 wt %, or about 99 wt % or less of the membrane.

The polymer fibers can have any suitable length and diameter. The polymer fibers can have a length that is less than, equal to, or greater than the thickness of the membrane. The polymer fibers can have a diameter (e.g., largest dimension perpendicular to a longitudinal direction) of about 1 nm to about 1 mm, about 1 nm to about 1,000 nm, or about 1 nm or more, or less than, equal to, or greater than about 2 nm, 4, 6, 8, 10, 15, 20, 25, 50, 75, 100, 150, 200, 250, 500, 750 nm, 1 micron, 2, 4, 6, 8, 10, 15, 20, 25, 50, 75, 100, 150, 200, 250, 500, or 750 microns, or about 1 mm or less.

During membrane formation, the polymer matrix can be a polymer that is combined with nanofibers or particles including the proton-conducting material, can be formed from shells of the nanofibers, can be formed from cores of the nanofibers, or any combination thereof. In embodiments wherein a polymer is added to nanofibers including the proton-conducting material during fabrication and the nanofibers include cores or shells, the polymer added to the nanofibers and the polymer of the nanofiber core or shell can be the same or different compositions.

Proton-Conducting Material.

The proton-conducting membrane can include a proton-conducting material. The proton-conducting material can be included in nanofibers in the membrane, the proton-conducting material can be included in particles in the membrane, or a combination thereof.

The proton-conducting material can be any suitable proton-conducting material. The proton-conducting material can be a proton-conducting inorganic material. The proton-conducting material can be an alkali (e.g., Li, Na, K, Rb, Cs, Fr, or a combination thereof) thio-hydroxo metal (e.g., wherein the alkali can be Li, Na, K, Rb, Cs, Fr, Be, Mg, Ca, Sr, Ba, Ra, Sc, Y, La, Ac, Ce, Th, Pr, Pa, Nd, U, Pm, Np, Sm, Pu, Eu, Am, Gd, Cm, Tb, Bk, Dy, Cf, Ho, Es, Er, Fm, Tm, Md, Yb, No, Lu, Lr, Ti, Zr, Hf, Rf, V, Nb, Ta, Db, Cr, Mo, W, Sg, Mn, Tc, Re, Bh, Fe, Ru, Os, Hs, Co, Rh, Ir, Ni, Pd, Pt, Cu, Ag, Au, Zn, Cd, Hg, Cn, Al, Ga, In, Tl, Sn, Pb, Bi, Po, or a combination thereof), an alkali thio-hydroxo metalloid (e.g., wherein the metalloid can be B, Si, Ge, As, Sb, Te, At, Al, or a combination thereof), a pyrophosphate, an ultraphosphate, or a combination thereof.

The proton-conducting material can include an alkali thio-hydroxo metalloid. The proton-conducting material can include an alkali thio-hydroxogermanate (ATHG). The proton-conducting material can have a chemical formula of $M_xGeS_x(OH)_{4-x} \cdot yH_2O$, wherein M is an alkali metal, wherein x is 1 to 4, and wherein y is 0 to 8. The variable M can be Na, K, Rb, or Cs. The variable M can be Cs. The proton-conducting material can include cesium thio-hydroxogermanate (CTHG).

The proton-conducting inorganic material can include an ultraphosphate, a pyrophosphate, or a combination thereof.

The proton-conducting inorganic material can include cerium ultraphosphate, cesium ultraphosphate, lanthanum ultraphosphate, neodymium ultraphosphate, samarium ultraphosphate, dysprosium ultraphosphate, gadolinium ultraphosphate, tin pyrophosphate, titanium pyrophosphate, silicon pyrophosphate, germanium pyrophosphate, cerium pyrophosphate, cerium pyrophosphate, zirconium pyrophosphate, or a combination thereof. The proton-conducting inorganic material can include cerium ultraphosphate, cesium ultraphosphate ($Cs_2P_5O_{14}$), or a combination thereof. The proton-conducting inorganic material can be cerium ultraphosphate ($CeP_5O_{14}$).

In some embodiments, the proton-conducting inorganic material is substantially free of dopants. In other embodiments, the proton-containing inorganic material can include a dopant, such as any suitable amount of any suitable dopant that allows the membrane to have the properties described herein, such as indium.

Particles including the proton-conducting material can be homogeneously distributed in the polymer matrix or on polymer fibers. Particles including the proton-conducting material can have any suitable particle size (e.g., largest dimension), such as about 1 nm to about 500 microns, about 1 nm to about 1,000 nm, or about 1 nm or more, or less than, equal to, or greater than about 2 nm, 4, 6, 8, 10, 15, 20, 25, 50, 75, 100, 150, 200, 250, 500, 750 nm, 1 micron, 2, 4, 6, 8, 10, 15, 20, 25, 50, 75, 100, 150, 200, 250 microns, or about 500 mm or less.

In embodiments of the membrane including polymer fibers having the proton-conducting material distributed therein, thereon, or a combination thereof, the polymer fiber can include a polymer that is continuous (e.g., forms an unbroken path) along a length of the polymer fiber, discontinuous along a length of the polymer fiber, or a combination thereof. The proton-conducting material can form any suitable proportion of the polymer fibers, such as about 0.01 wt % to about 99.99 wt % of the polymer fibers, about 20 wt % to about 95 wt %, or about 0.01 wt % or more, or less than, equal to, or greater than about 0.05 wt %, 0.1, 0.2, 0.4, 0.6, 0.8, 1, 1.5, 2, 3, 4, 5, 6, 8, 10, 15, 20, 25, 30, 35, 40, 45, 50, 55, 60, 65, 70, 75, 80, 85, 90, 91, 92, 93, 94, 95, 96, 97, 99, or 99.9 wt %, or about 99.99 wt % or less. In the membrane, the polymer fibers having the proton-conducting material therein, thereon, or a combination thereof are matted together in an orientation that is substantially parallel to a plane of the membrane as an unwoven heat-pressed mat. Polymer fibers can be distributed homogenously in the membrane.

In embodiments of the membrane including a polymer matrix having a proton-conducting material distributed in the polymer matrix (e.g., as particles, nanofibers, or a combination thereof), the proton-conducting material can form any suitable proportion of the membrane, such as about 0.01 wt % to about 99.99 wt % of the membrane, 50 wt % to 70 wt %, 90 wt % to 99 wt %, 20 wt % to 95 wt %, or about 0.01 wt % or more, or less than, equal to, or greater than about 0.05 wt %, 0.1, 0.2, 0.4, 0.6, 0.8, 1, 1.5, 2, 3, 4, 5, 6, 8, 10, 15, 20, 25, 30, 35, 40, 45, 50, 55, 60, 65, 70, 75, 80, 85, 90, 91, 92, 93, 94, 95, 96, 97, 99, or 99.9 wt %, or about 99.99 wt % or less. The polymer matrix can have lower proton conductivity than the proton-conducting nanofibers, the particles including the proton-conducting material, or a combination thereof. The polymer matrix can be protonically-insulating, or proton-conducting.

Nanofibers Including the Proton-Conducting Material.

The proton-conducting membrane can include nanofibers that include the proton-conducting material, such as wherein the nanofibers are distributed in a polymer matrix. The proton-conducting material can be any suitable proportion of the nanofibers, of a core of the nanofibers, or of a shell of the nanofibers, such as about 50 wt % to about 100 wt % of the nanofibers, about 95% to about 100 wt %, or less than, equal to, or greater than about 50 wt %, 55, 60, 60, 70, 75, 80, 82, 84, 86, 88, 90, 91, 92, 93, 94, 95, 96, 97, 98, 99, 99.9, 99.99, or about 99.999 wt % or more. In some embodiments, the nanofibers can be the proton-conducting material, such that about 100% of the nanofibers is the proton-conducting material.

Each nanofiber includes a proton-conducting inorganic material that can be continuous or discontinuous along a length of the nanofiber. A continuous proton-conducting material forms a continuous proton-conducting path from one end of proton-conducting material to the other end.

In some embodiments, the nanofibers can be a nonwoven mat of fibers, such as formed by heat-pressing the fibers such that the fibers are substantially oriented in a direction parallel to the plane of the membrane. In other embodiments, each nanofiber is aligned perpendicularly to the plane of the membrane (e.g., orthogonally to the membrane), such as within about 0-30 degrees of the direction perpendicular to the plane of the membrane, about 0-10 degrees, or about 0 degrees, or less than, equal to, or greater than 2 degrees, 4, 6, 8, 10, 12, 14, 16, 18, 20, 22, 24, 26, 28, or about 30 degrees or more.

Each nanofiber can be continuous (e.g., unbroken) from one major face of the membrane to another major face of the membrane. In other embodiments, one or more of the nanofibers are not continuous from one major face of the membrane to the other major face of the membrane.

The nanofibers can be distributed heterogeneously or homogeneously across the major faces of the membrane. In some embodiments, the nanofibers can be aligned parallel to one another, such as within 0-30 degrees of one another, about 0-10 degrees, or about 0 degrees, or less than, equal to, or greater than 2 degrees, 4, 6, 8, 10, 12, 14, 16, 18, 20, 22, 24, 26, 28, or about 30 degrees or more. In other embodiments nanofibers are not aligned (e.g., other than by chance due to fabrication conditions) and are a woven or non-woven mat in the membrane.

The proton-conducting nanofibers can have a uniform composition (e.g., can include or consist of only one material: the proton-conducting inorganic material) or can have a core-shell structure with a core having a different composition than the shell. The nanofibers can each include a polymer shell that surrounds the proton-conducting inorganic material, wherein the polymer shell is continuous along a length of the nanofiber. The nanofibers can include a core including the proton-conducting inorganic material, and a shell that is continuous along a length of the nanofiber, with the shell having the same or different composition as the polymer matrix. Alternatively, the nanofibers can each include a proton-conducting shell (e.g., coating) including the proton-conducting inorganic material (e.g., as a coating of nanoparticles distributed thereon), and a polymer core that has the same or different composition as the polymer matrix, wherein the polymer core is continuous along a length of the nanofiber. The shell (e.g., polymer material or proton-conducting material) can have any suitable thickness, such as a thickness of about 1 nm to about 1,000 nm, about 50 nm to about 250 nm, or about 1 nm or less, or less than, equal to, or greater than about 2 nm, 4, 6, 8, 10, 15, 20, 25, 50, 100, 150, 200, 250, 300, 350, 400, 450, 500, 600, 700, 800, 900 nm, or about 1,000 nm or more. The core (e.g., polymer material or proton-conducting material) can have a largest dimension perpendicular to a longitudinal direction (e.g., a diameter) of about 1 nm to about 1,000 nm, about 50 nm to about 250 nm, or about 1 nm or less, or less than, equal to, or greater than about 2 nm, 4, 6, 8, 10, 15, 20, 25, 50, 100, 150, 200, 250, 300, 350, 400, 450, 500, 600, 700, 800, 900 nm, or about 1,000 nm or more.

The proton-conducting inorganic material of the nanofibers can have a largest dimension perpendicular to a longitudinal direction (e.g., a diameter) of about 1 nm to about 1,000 nm, about 50 nm to about 250 nm, or about 1 nm or less, or less than, equal to, or greater than about 2 nm, 4, 6, 8, 10, 15, 20, 25, 50, 100, 150, 200, 250, 300, 350, 400, 450, 500, 600, 700, 800, 900 nm, or about 1,000 nm or more.

The nanofibers can have any suitable length. For membranes having nanofibers aligned perpendicular to a plane of the membrane, the nanofibers can have a length that is approximately equal to the thickness of the membrane. For membranes having nanofibers that are not aligned to be perpendicular to a plane of the membrane, such as membranes including randomly aligned fibers in the form of nonwoven mats, the nanofibers can have a length that is less than, equal to, or greater than a thickness of the membrane, such as about 100 nm to about 1 m, about 0.001 cm to about 0.05 cm, or about 100 nm or less, or less than, equal to, or greater than 150 nm, 200, 250, 300, 350, 400, 450, 500, 600, 700, 800, 900 nm, 0.0001 cm, 0.0005, 0.001, 0.005, 0.01, 0.05, 0.1, 0.5, 1, 5, 10, 50 cm, or 1 meter or more.

The nanofibers can have any suitable density as measured from a major face of the membrane, such as about 1 nanofibers/$\mu m^2$ to about 100,000 nanofibers/$\mu m^2$, or less than, equal to, or greater than about 1 nanofibers/$\mu m^2$, 2, 5, 10, 25, 50, 75, 100, 150, 200, 250, 500, 750, 1,000, 1,500, 2,000, 2,500, 5,000, 10,000, 15,000, 20,000, 25,000, 50,000, 75,000, or about 100,000 nanofibers/$\mu m^2$ or more.

In some embodiments, the nanofibers contact one another in the membrane, or can be free of contact with one another in the membrane. Nanofibers that lack a core-shell structure and are formed of only the proton-conducting material can be insulated from contact with one another by the polymer matrix, or can contact one another within the polymer matrix. A nanofiber including a shell of polymer material and a core of proton-conducting inorganic material can have its shells in contact with one another in the membrane, or the shells can be free of contact with one another, such as via separation by the polymer matrix. In embodiments wherein the polymer matrix and shells on the nanofibers have the same composition, the lack of contact may be undetectable in the finished membrane due to melding of the polymer of the matrix and the shells together. A nanofiber including a shell of proton-conducting inorganic material and a core of material can be insulated from contact with one another by the polymer matrix, or can contact one another within the polymer matrix.

FIG. 1A illustrates a membrane including core-shell ATHG-PBI nanofibers contained within and perpendicularly aligned to the plane of a PBI matrix (e.g., to the horizontal plane of the membrane). Because each nanofiber core includes a continuous strand, each core-shell nanofiber functions as a high-efficiency proton-conducting conduit running through the membrane. Such a membrane can be prepared via a method including co-electrospinning to yield core-shell nanofibers, nanofiber alignment, and heat pressing. The proton-exchange membrane includes a polymer matrix including polybenzimidazole (PBI). The membrane includes proton-conducting nanofibers distributed in the polymer matrix, wherein each nanofiber is aligned perpendicularly to a plane of the membrane. Each nanofiber includes a core that is continuous along a length of the nanofiber and that includes a proton-conducting inorganic material, the proton-conducting inorganic material including an alkali thio-hydroxogermanate (ATHG). Each nanofiber also includes a shell that is continuous along the length of the nanofiber, the shell including polybenzimidazole (PBI). Each nanofiber is continuous from one major face of the membrane to another major face of the membrane.

Figure 1B:
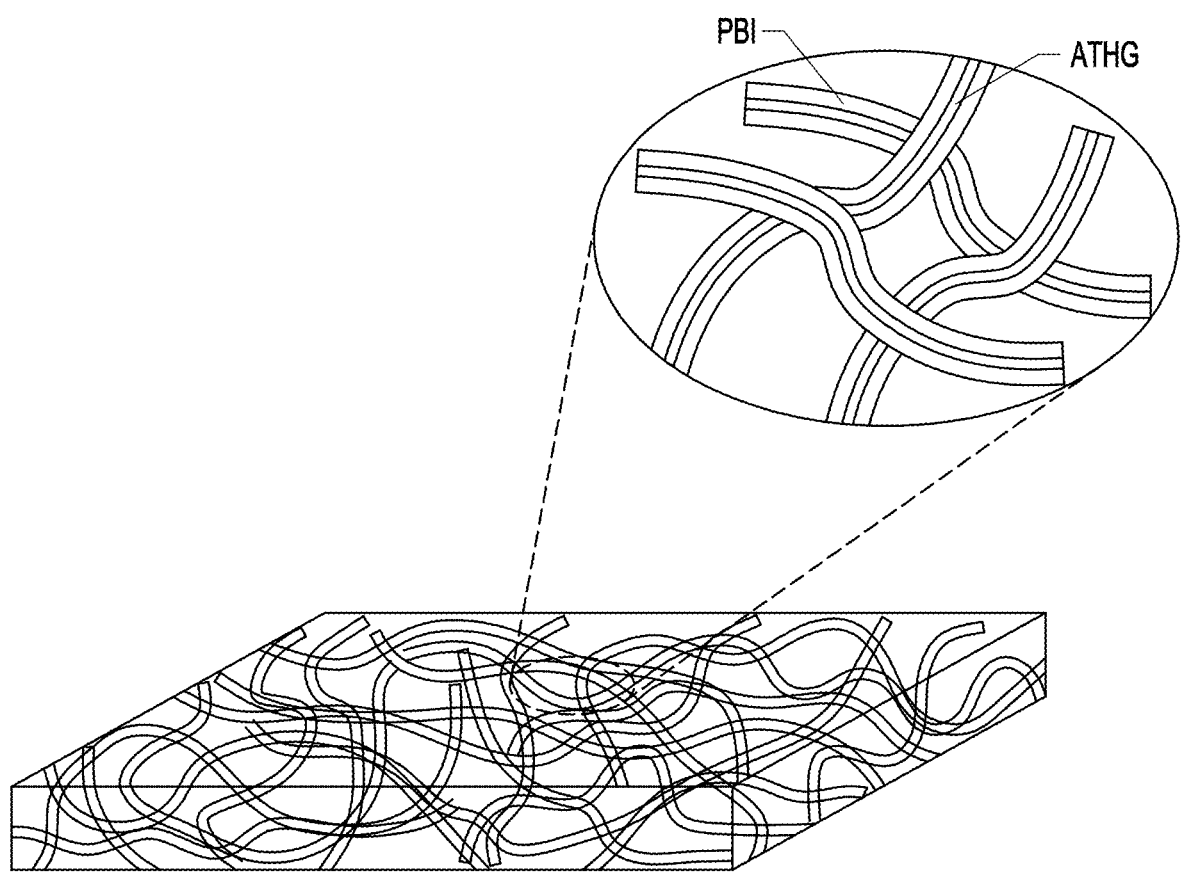
FIG. 1B illustrates a membrane including a mat of unaligned, nonwoven core-shell ATHG-PBI nanofibers, in accordance with various embodiments.

FIG. 1B illustrates a membrane including a mat of unaligned, nonwoven core-shell ATHG-PBI nanofibers. Although each nanofiber functions as a proton-conducting conduit, because the nanofibers are not aligned in relation to the membrane plane (as in the membrane of FIG. 1A), achievable proton conductivity is typically lower than for the membrane of FIG. 1A. The membrane of FIG. 1B can be produced via a method including co-electrospinning to yield core-shell nanofibers (e.g., as a mat of fibers with random alignment) and heat pressing. The proton-exchange membrane includes a polymer matrix including polybenzimidazole (PBI). Each nanofiber includes a core that is continuous along a length of the nanofiber and that includes a proton-conducting inorganic material, the proton-conducting inorganic material including an alkali thio-hydroxogermanate (ATHG). Each nanofiber also includes a shell that is continuous along the length of the nanofiber, the shell including polybenzimidazole (PBI).

Figure 1C:
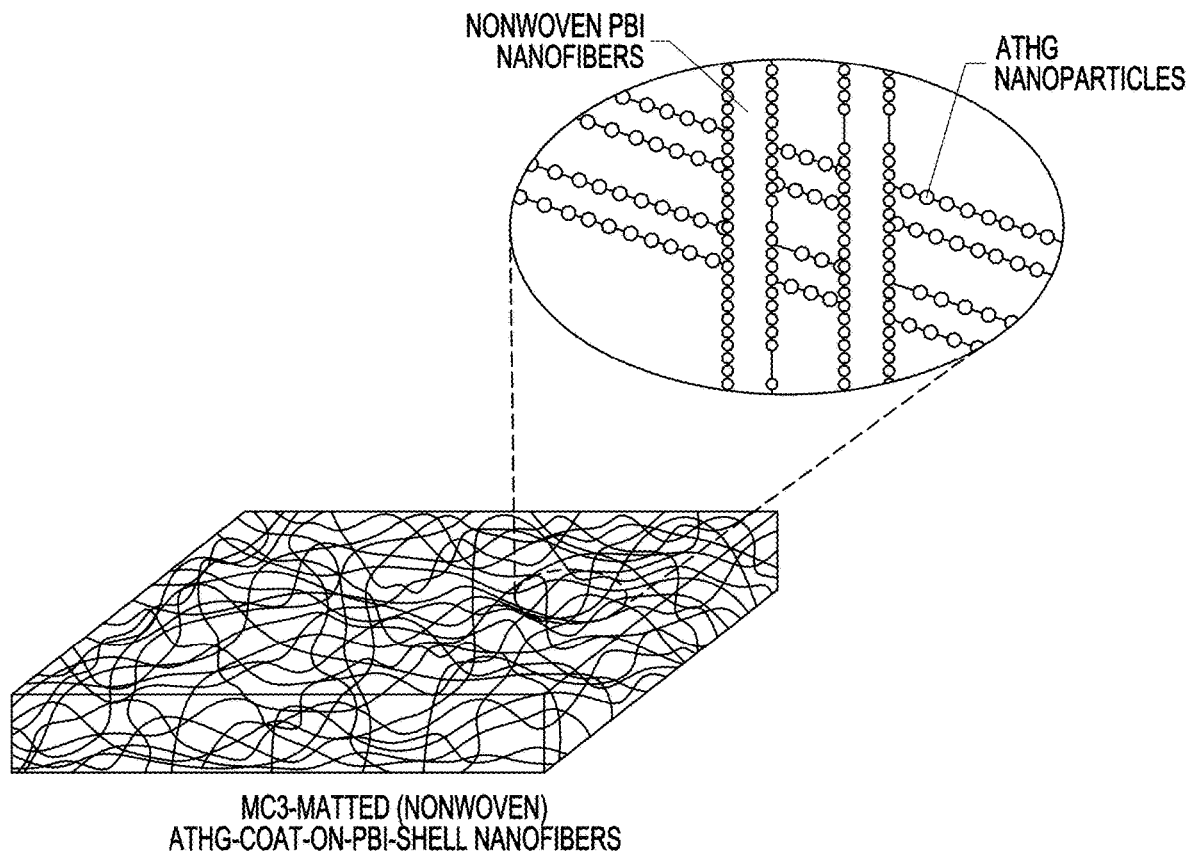
FIG. 1C illustrates a membrane including a mat of unaligned, nonwoven core-shell PBI-ATHG nanofibers, in accordance with various embodiments.

FIG. 1C illustrates a membrane including a mat of unaligned, nonwoven core-shell PBI-ATHG nanofibers. The membrane can be produced via a method including electro-spinning to yield PBI nanofibers, ATHG coating of nanofibers via electrospraying, optional coated nanofiber alignment (if desired), and heat pressing. The proton-exchange membrane can include a polymer matrix. The membrane can include proton-conducting nanofibers distributed in the polymer matrix. The polymer matrix can be exclusively the PBI cores of the fibers, or can be a combination of the PBI cores of the fibers and PBI that is added during the heat pressing. Each nanofiber includes a core that is continuous along a length of the nanofiber and that includes polybenzimidazole (PBI). Each nanofiber includes a shell (e.g., a coating of ATHG nanoparticles) that is continuous along the length of the nanofiber and that includes a proton-conducting inorganic material that is continuous along a length of the nanofiber, the proton-conducting inorganic material including an alkali thio-hydroxogermanate (ATHG).

The membrane can have any suitable level of gas permeability during use. For example, during use, the membrane can allow less than 1%-10% of a gas (e.g., any gas, such as hydrogen) to cross (e.g., pass through) the membrane, less than 5%, less than 2%, or less than 10%, 9, 8, 7, 6, 5, 4, 3.5, 3, 2.5, 2, 1.5, 1, 0.5, 0.2, 0.1, or less than 0.01%.

Apparatus Including the Membrane.

In various embodiments, the present invention provides an apparatus that includes the membrane. The apparatus can be any suitable apparatus that includes the membrane.

In some embodiments, the apparatus is an electrochemical cell that includes the membrane. The apparatus can include an anode, a cathode, and an embodiment of the membrane that separates the anode and the cathode. A method of using the apparatus can include applying or generating an electrical potential between the anode and the cathode. In various embodiments, the electrochemical cell can be a fuel cell, an ammonia-forming cell, or a water-electrolysis cell.

In some embodiments, the apparatus is an ammonia-forming apparatus that includes the membrane. The apparatus can include an anode, a cathode, and an embodiment of the membrane that separates the anode and the cathode.

A method of using the apparatus can include applying or generating an electrical potential between the anode and the cathode such that ammonia is generated from the cathode.

In some embodiments, the apparatus is a water-electrolysis apparatus that includes the membrane, wherein the apparatus can be used to generate hydrogen from the electrolysis of water. The apparatus can include an anode, a cathode, and an embodiment of the membrane that separates the anode and the cathode. A method of using the apparatus can include applying or generating an electrical potential between the anode and the cathode such that hydrogen is generated from the cathode.

Method of Using the Membrane.

In various embodiments, the present invention provides a method of using an embodiment of the membrane. The method can include conducting protons from one major face of the membrane to another major face with a conductivity of at least about $10^{-4}$ S/cm, at least $10^{-3}$ S/cm, at least $10^{-2}$ S/cm, about $10^{-6}$ S/cm to about $10^{-1}$ S/cm, $5 \times 10^{-5}$ S/cm to about $1 \times 10^{-1}$ S/cm, or about $10^{-6}$ or less, or less than, equal to, or greater than $5 \times 10^{-6}$, $1 \times 10^{-5}$, $5 \times 10^{-5}$, $1 \times 10^{-4}$, $2 \times 10^{-4}$, $4 \times 10^{-4}$, $6 \times 10^{-4}$, $8 \times 10^{-4}$, $1 \times 10^{-3}$, $2 \times 10^{-3}$, $4 \times 10^{-3}$, $6 \times 10^{-3}$, $8 \times 10^{-3}$, $1 \times 10^{-2}$, $2 \times 10^{-2}$, $4 \times 10^{-2}$, $5 \times 10^{-2}$, $8 \times 10^{-2}$, or about $1 \times 10^{-1}$ or more while the membrane is at a temperature of ≥450° C., ≥400° C., ≥350° C., ≥300° C., ≥200° C., ≥200 to ≤450° C., ≥200 to ≤400° C., ≥200 to ≤350° C., ≥200 to ≤300° C., or 200° C. or less, or less than, equal to, or greater than 210° C., 220, 230, 240, 250, 260, 270, 280, 290, 300, 310, 320, 330, 340, 350, 360, 370, 380, 390, 400, 410, 420, 430, 440° C., or 450° C. or more. The method can include conducting protons from one major face of the membrane to the other major face with a humidity of about 0 g/m³ to about 3,000 g/m³, 200 g/m³ to 1,000 g/m³, 650 g/m³ to 1350 g/m³, or about 0 g/m³ or more, or less than, equal to, or greater than 10 g/m³, 15, 20, 25, 50, 75, 100, 125, 150, 175, 200, 250, 300, 350, 400, 450, 500, 550, 600, 650, 700, 750, 800, 850, 900, 950, 1,000, 1,050, 1,100, 1,150, 1,200, 1,250, 1,300, 1,400, 1,500, 1,600, 1,800, 2,000, or 2,500 g/m³, or about 3,000 g/m³ or less. The method can include adding water or steam to the air that surrounds the membrane and any associated anode and/or cathode.

Method of Making the Membrane.

In various embodiments, the present invention provides a method of making an embodiment of the membrane. The method can include co-electrospinning a solution including the proton-conducting inorganic material and a solution including a heat-resistant polymer to form core-shell nanofibers including a core that includes the proton-conducting inorganic material and including a polymer shell that has the same or different composition as the polymer matrix. The method can include heat pressing the nanofibers to form the membrane.

In some embodiments, the heat pressing includes heat pressing the fibers, such as without adding any material to the fibers during the heat pressing. The heat pressing can form a non-woven pressed mat of the fibers that is parallel to the plane of the membrane. 1n some embodiments, the fibers can include heat-resistant polymer shells, and heat pressing the fibers can cause the heat-resistant polymer shells to meld together to form the polymer matrix of the membrane.

In some embodiments, the heat pressing includes heat pressing the fibers with a heat-resistant polymer. For example, the fibers can include heat-resistant polymer shells, and heat pressing the fibers with heat-resistant polymer can form the polymer matrix of the membrane having the fibers therein. The heat-resistant polymer heat pressed with the fibers can be the same or different heat-resistant polymer as the shell of the fibers. If the heat-resistant polymer heat pressed with the fibers is the same as the heat-resistant polymer of the shells, during the heat pressing the shell polymer and the matrix polymer can meld together such that they are a continuous heat-resistant polymer in the membrane and such that the heat-resistant polymer shells cannot be distinguished from the heat-resistant polymer heat pressed with the fibers.

In some embodiments, the fibers can include a heat-resistant polymer core with a proton-conducting shell (e.g., a shell of proton-conducting material such as a coating or nanoparticles of the proton-conducting material), and the fibers can be pressed together with or without a heat-resistant polymer. If the fibers are pressed together without a heat-resistant polymer, the cores of the fibers can form the polymer matrix of the membrane. If the fibers are pressed together with a heat-resistant polymer, the polymer can form the polymer matrix of the membrane, and the cores of the fibers can also form the polymer matrix of the membrane.

In some embodiments, a coaxial nozzle can be used during the co-electrospinning to form the core-shell nanofibers, such as wherein a core material and a shell material are both electrospun from the nozzle to form the nanofibers.

The method can include aligning the nanofibers perpendicular to a plane of the membrane before the heat pressing. In other embodiments, the method is free of aligning the fibers, and the fibers are pressed into a nonwoven matt of unaligned fibers.

Figure 2A:
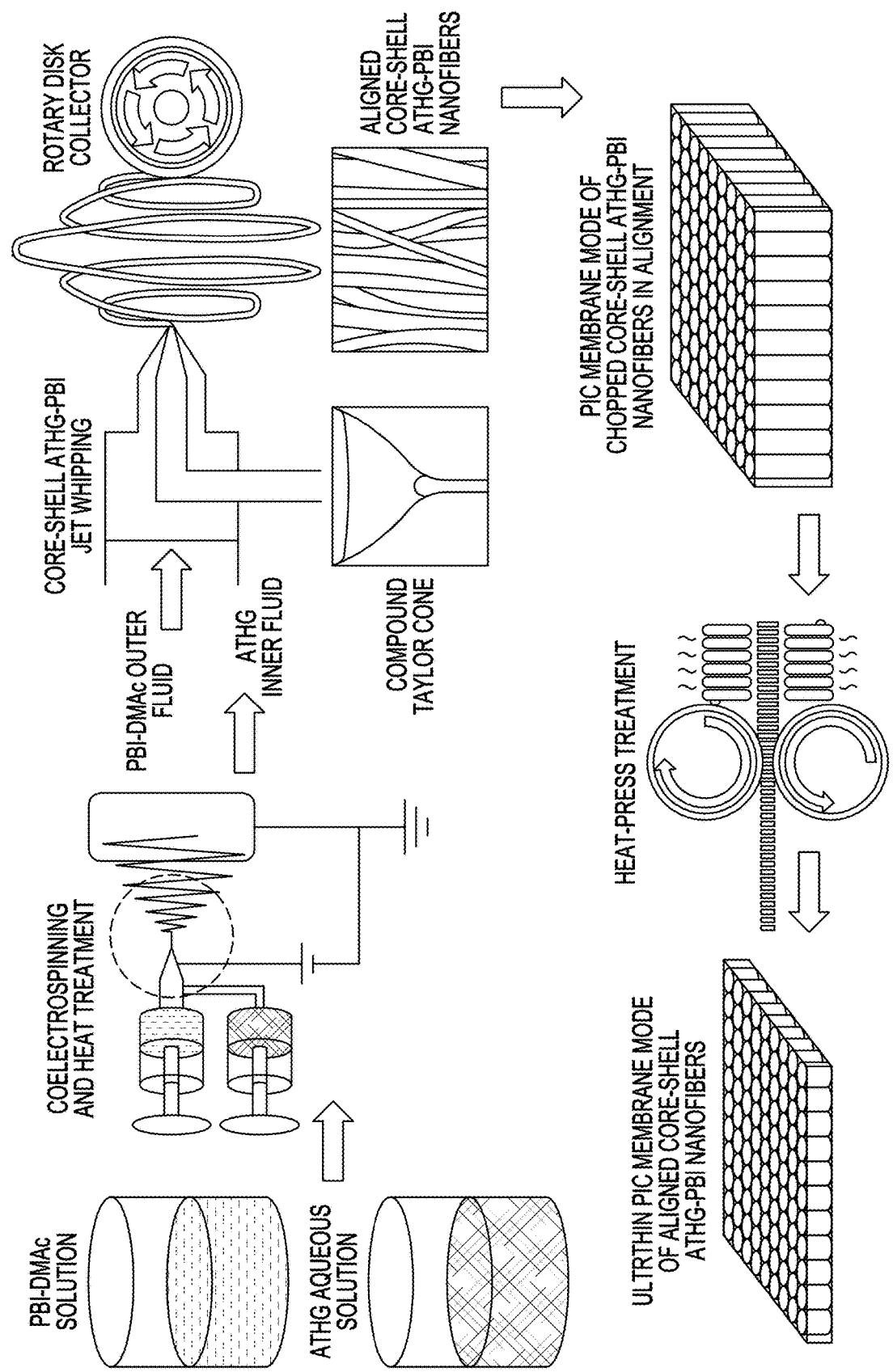
FIG. 2A illustrates a synthesis method for making a membrane including aligned core-shell ATHG-PBI nanofibers, in accordance with various embodiments.
Figure 2B:
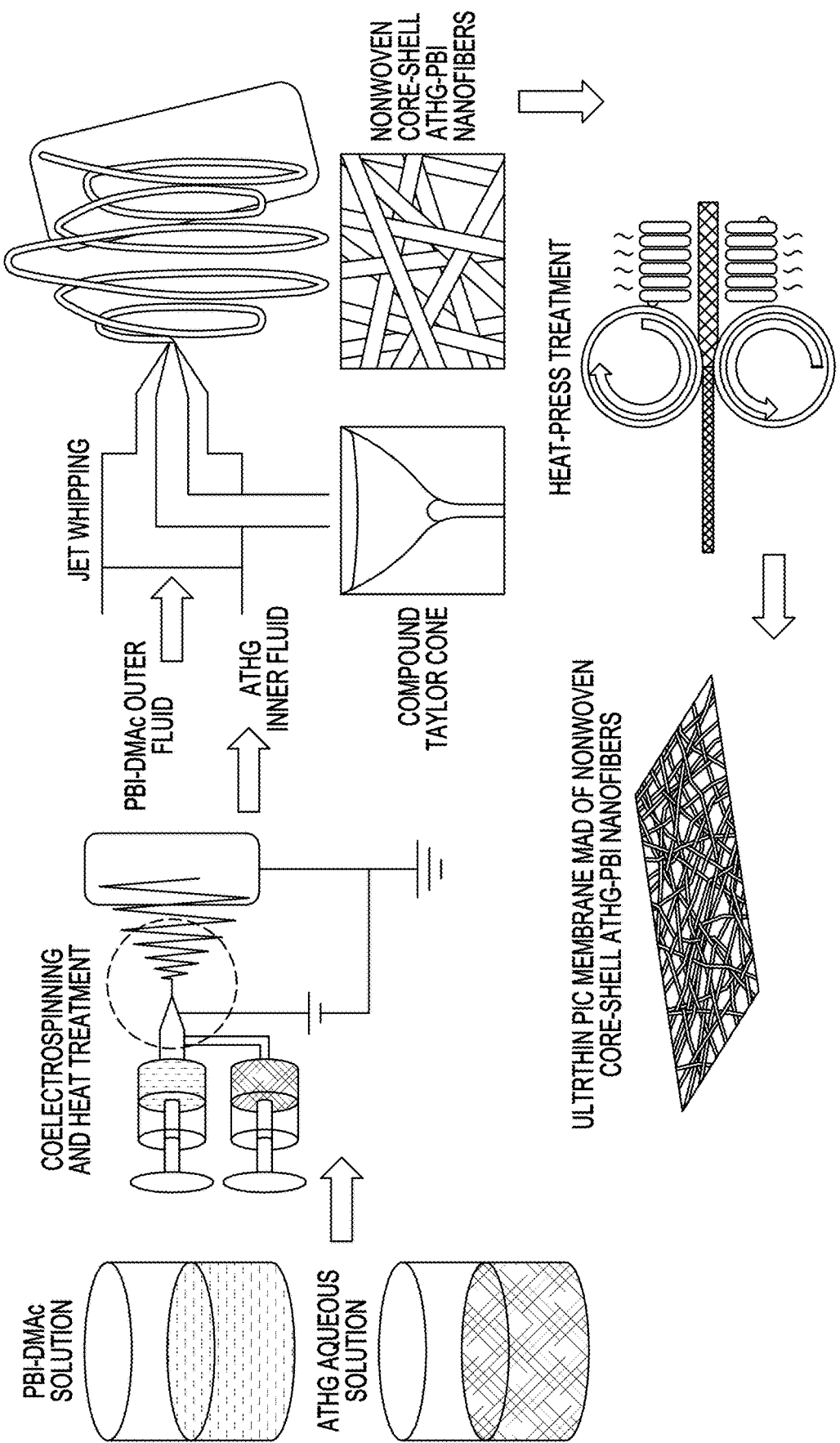
FIG. 2B illustrates a synthesis method for making a membrane including unaligned core-shell ATHG-PBI nanofibers, in accordance with various embodiments.
Figure 2C:
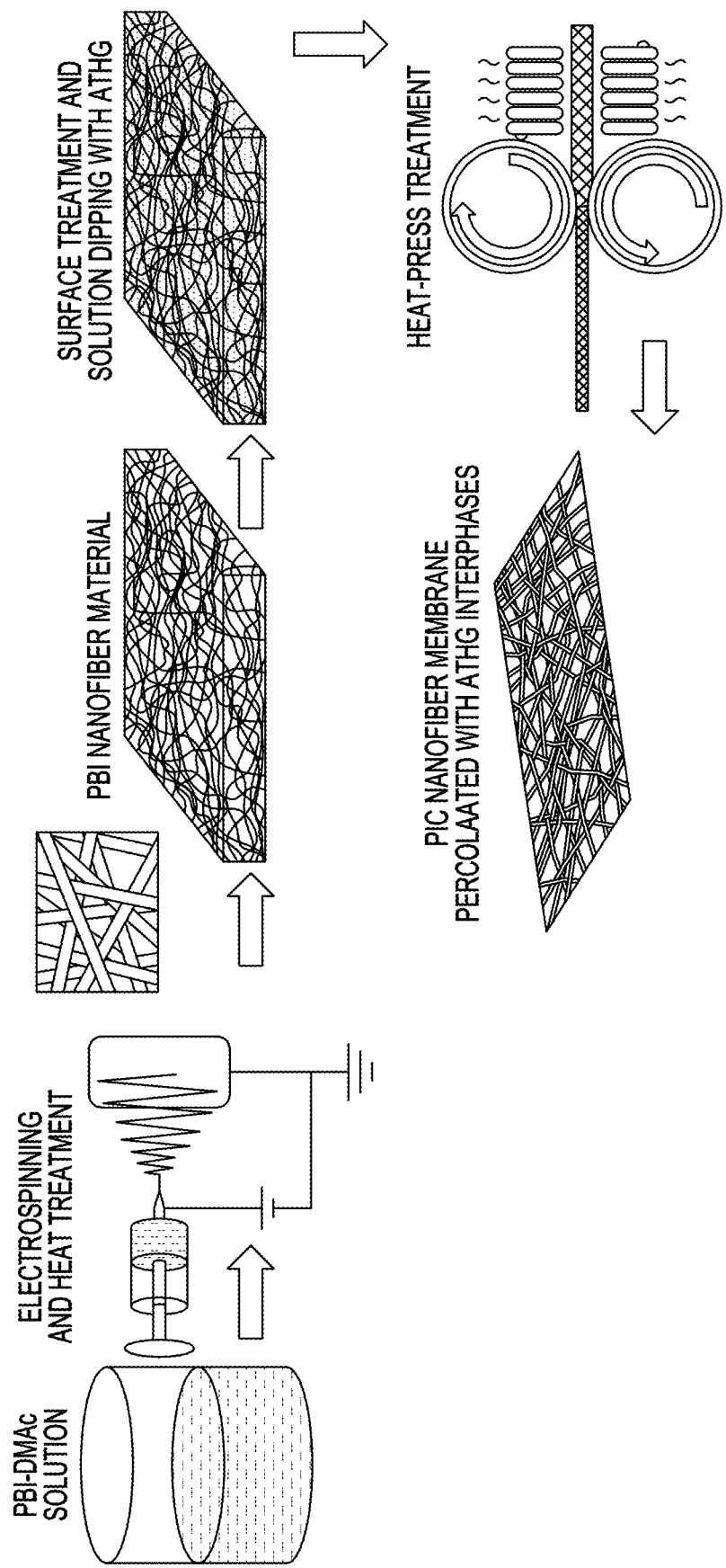
FIG. 2C illustrates a synthesis method for making a membrane including unaligned core-shell PBI-ATHG nanofibers, in accordance with various embodiments.

FIG. 2A illustrates a synthesis method for making a membrane including aligned core-shell ATHG-PBI nanofibers. FIG. 2B illustrates a synthesis method for making a membrane including unaligned core-shell ATHG-PBI nanofibers. FIG. 2C illustrates a synthesis method for making a membrane including unaligned core-shell PBI-ATHG nanofibers (e.g., coating of ATHG nanoparticles on PBI fiber).

In some embodiments, the method includes forming an embodiment of the membrane that includes fibers that include a core that includes heat-resistant polymer and a shell that includes the proton-conducting inorganic material. The method can include forming core-shell nanofibers including a core and shell, the forming including electrospinning a heat-resistant polymer to form the core including a polymer that has the same or different composition as the polymer matrix, and electrospray coating the core or solution dipping the core to form the shell including the proton-conducting inorganic material. Solution dipping can include immersing, spraying, dipping, or otherwise contacting the core with solution that forms the proton-conducting inorganic material on the core. The method can include heat pressing the nanofibers to form the membrane. The method can include aligning the fibers before the heat pressing, or the fibers can be heat pressed as-is with no alignment to form a nonwoven mat of the fibers.

In various embodiments, the method of making the membrane includes forming an embodiment of the membrane that includes a polymer matrix including particles including a proton-conducting material homogeneously distributed therein. The method can include combining a polymer solution and particles including the proton-conducting material to form a mixture. The method can include drying the mixture. The method can include pulverizing the dried mixture. The method can optionally include further processing the dried mixture including adding a polymer solution to the dried mixture, drying the resulting mixture, and pulverizing the resulting dried mixture. The method can include adding a solvent to the dried mixture to form a dough. The method can also include pressing the dough to form the membrane (e.g., at a pressure of at least about 16,000 psi). The solvent can be any suitable organic solvent. The solvent can be an amide solvent, such as a dialkyl formamide or a dialkylacetamide, such as dimethylacetamide. The membrane formed using the method can have any suitable properties, such as a proton conductivity of at least 0.02 siemens/centimeter (S/cm), gas permeability of less than 2% (e.g., less than 2% of gas crosses the membrane, such as less than 2% of anode-side hydrogen passes to the cathode side), and long-term (e.g., at least 1000 hours) durability, all at a temperature of at least about 300° C.

In various embodiments, the method of making the membrane includes forming an embodiment of the membrane that includes a polymer matrix including particles including a proton-conducting material homogeneously distributed therein via a film casting procedure. The method can include combining a polymer solution and a suspension of particles including the proton-conducting material to form a mixture. The method can include applying the mixture to a flat surface. The method can also include drying the mixture on the flat surface to form the membrane. The polymer solution can be a PBI solution.

In various embodiments, the method of making the membrane includes forming an embodiment of the membrane that includes polymer fibers including particles including a proton-conducting material therein. The method can include combining a polymer solution and a suspension of particles including the proton-conducting material to form a mixture. The method can include electrospinning the mixture to form polymer fibers including particles therein, the particles including the proton-conducting material. The method can include heat pressing the polymer fibers into a mat, to form the membrane.

Method of Using an Apparatus that Includes the Membrane.

Various embodiments of the present invention provide a method of forming ammonia using an embodiment of the membrane. The method can include generating ammonia from a cathode of an ammonia-production cell. The ammonia-production cell can include an anode, the cathode, and an embodiment of the membrane that separates the anode and the cathode. The ammonia can be generated with the membrane at a temperature of about 200° C. to about 450° C., or less than, equal to, or greater than 200° C., 220, 230, 240, 250, 260, 270, 280, 290, 300, 310, 320, 330, 340, 350, 360, 370, 380, 390, 400, 410, 420, 430, 440° C., or 450° C. or more. The method can include applying an electrical potential between the anode and the cathode.

Various embodiments of the present invention provide a method of water electrolysis using an embodiment of the membrane. The method can include generating hydrogen from a cathode of an electrolysis cell. The cell can include an anode, the cathode, and an embodiment of the membrane that separates the anode and the cathode. The hydrogen can be generated with the membrane at a temperature of about 200° C. to about 450° C., or less than, equal to, or greater than 200° C., 220, 230, 240, 250, 260, 270, 280, 290, 300, 310, 320, 330, 340, 350, 360, 370, 380, 390, 400, 410, 420, 430, 440° C., or 450° C. or more. The method can include applying an electrical potential between the anode and the cathode.

In some embodiments, the present invention provides a method of operating an electrochemical cell that includes an embodiment of the membrane. The cell can include an anode, a cathode, and an embodiment of the membrane that separates (e.g., electrically insulates) the anode and the cathode from one another. The method can include generating or applying an electrical potential between the anode and the cathode. In some embodiments, the electrochemical cell is a fuel cell. The method can include operating the electrochemical cell with the membrane at a temperature of about 150° C. to about 450° C., or less than, equal to, or greater than 150° C., 160, 170, 180, 190, 200, 220, 230, 240, 250, 260, 270, 280, 290, 300, 310, 320, 330, 340, 350, 360, 370, 380, 390, 400, 410, 420, 430, 440° C., or 450° C. or more.

EXAMPLES

Various embodiments of the present invention can be better understood by reference to the following Examples which are offered by way of illustration. The present invention is not limited to the Examples given herein.

Example 1. Formation of Membrane Including Matted Nanofibers with Cesium Thio-Hydroxogermanate Core and Polybenzimidazole Shell Cesium thio-hydroxogermanate (CTHG) core/polybenzimidazole (PBI) shell nanofibers were prepared by co-electrospinning a dimethylacetamide (DMAc) solution of 18 wt % PBI and a water solution of 80 wt % CTHG. The co-electrospinning was performed using a coaxial nozzle at the electrospinning tip, with the 18% PBI in DMAc solution as the outer fluid (to yield nanofiber shell) and the aqueous 80% CTHG solution as the inner fluid (to yield nanofiber core). The fabrication process utilized a co-electrospinning setup including 1) a coaxial stainless steel nozzle (spinneret), with each spinneret tube (inner and outer) connected to a digital syringe pump (Cole-Parmer single-syringe infusion pump), 2) rotary drum fiber collector (home-made), and 3) high-voltage direct current (DC) power supply (Gamma high-voltage DC power supply) with its positive electrode connected to the spinneret and its negative electrode connected to the fiber collector. The size of the co-axial spinneret inner and outer tube was 23 G (i.e., about 0.6414 mm) and 17G (i.e., about 1.473 mm), respectively. The distance between the coaxial spinneret and the fiber collector was ~20 cm, and the DC voltage applied between the spinneret and fiber collector was ~20-25 kV. Two digital syringe pumps were used to feed the PBI/DMAc solution (at rate of 3-5 mL/hour) into the outer tube and to feed the aqueous CTHG solution (at a rate of 1-2 mL/hour) into the inner tube to form a coaxial Taylor cone at the tip of the coaxial spinneret under the electrical field exerted by the DC power supply. With increasing DC voltage, the coaxial Taylor cone was deformed, elongated, and finally ejaculated into a stable coaxial jet upon the electrical field reaching the threshold value. After a variety of jet instabilities (e.g., vigorous jet whipping, looping, etc.) and solvent evaporation, continuous core-shell CTHG/PBI nanofibers deposited onto a rotary drum fiber collector to form a nonwoven, non-aligned nanofiber mat. Average nanofiber PBI shell diameter was ~300-500 nanometers, and average CTHG core diameter was ~100-200 nanometers. The thickness of the nanofiber mat was adjusted by controlling the electrospinning time.

Figure 3A:
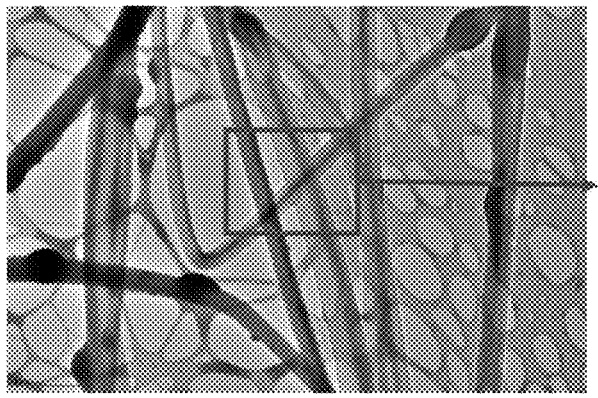
FIGS. 3A-3B illustrate transmission electron microscopy (TEM) images of photographs of core-shell CTHG-PBI nanofibers, in accordance with various embodiments.
Figure 3B:
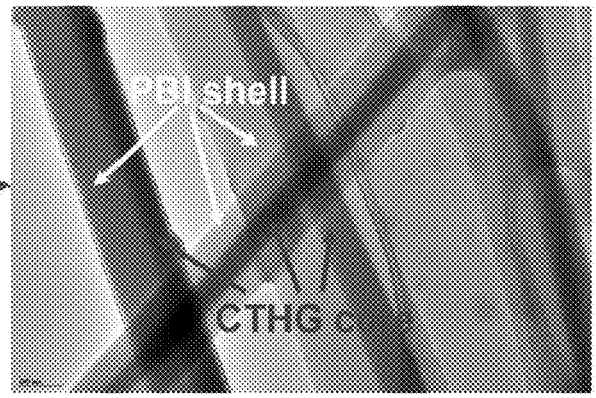
Figure 4A:
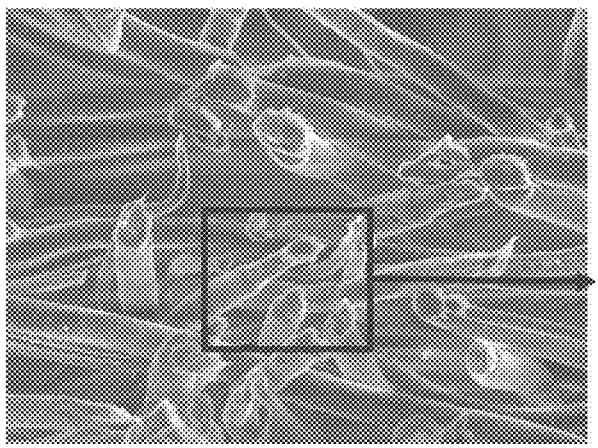
FIGS. 4A-4B illustrate scanning electron microscopy (SEM) images of a cross-section of a CTHG-PBI nanofiber mat, in accordance with various embodiments.
Figure 4B:
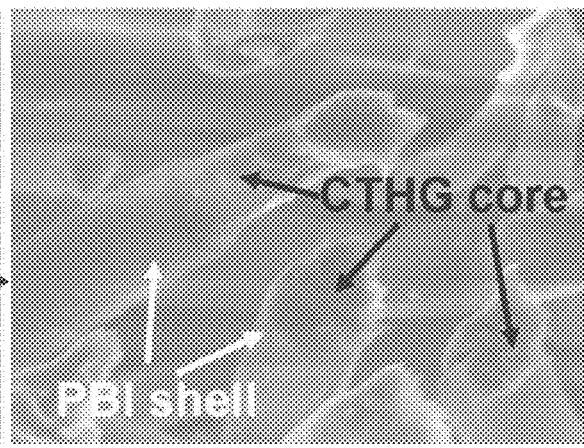

To improve core-shell nanofiber quality (with highest quality defined as continuous uniform-diameter cores contained in continuous uniform-thickness shells), a co-electrospinning airflow assist was applied via an in-lab-fabricated plastic tubular airflow ring. This airflow ring was installed to surround the coaxial spinneret and generate strong shear airflow at an air pressure of ~10 psi by using a pressure valve connected to a compressed air tank. Compared to traditional co-electrospinning without airflow assist, the airflow assist enabled a 10-fold increase in nanofiber productivity and an increase in CTHG loading from about 25% to 60%. FIGS. 3A-3B illustrate transmission electron microscopy (TEM) images of the core-shell CTHG-PBI nanofibers fabricated with airflow assistance. FIGS. 4A-4B illustrate scanning electron microscopy (SEM) images of a cross-section of the as-fabricated airflow-assisted core shell CTHG-PBI nanofiber mat, prior to pressing. The nanofibers were continuous, uniform-diameter CTHG cores inside continuous uniform-thickness PBI shells. The CTHG core diameters were 100-200 nm.

The as-fabricated core-shell CTHG-PBI nanofiber mat was subjected to a controlled heat-pressing process to eliminate porosity (e.g., achieving gas impermeability) and improve mechanical strength. A commercially available hot-press machine was utilized for this process. Matted nanofiber samples were pressed at temperatures of 21° C. or 200° C., at pressures of 1,000, 2,000, or 3,000 psi, for durations of 1 or 2 minutes. Resulting CTHG-PBI core-shell nanofiber-based membranes had thicknesses of 80-200 micrometers, depending on initial thickness of the as-fabricated porous core-shell CTHG-PBI mat.

Figure 5:
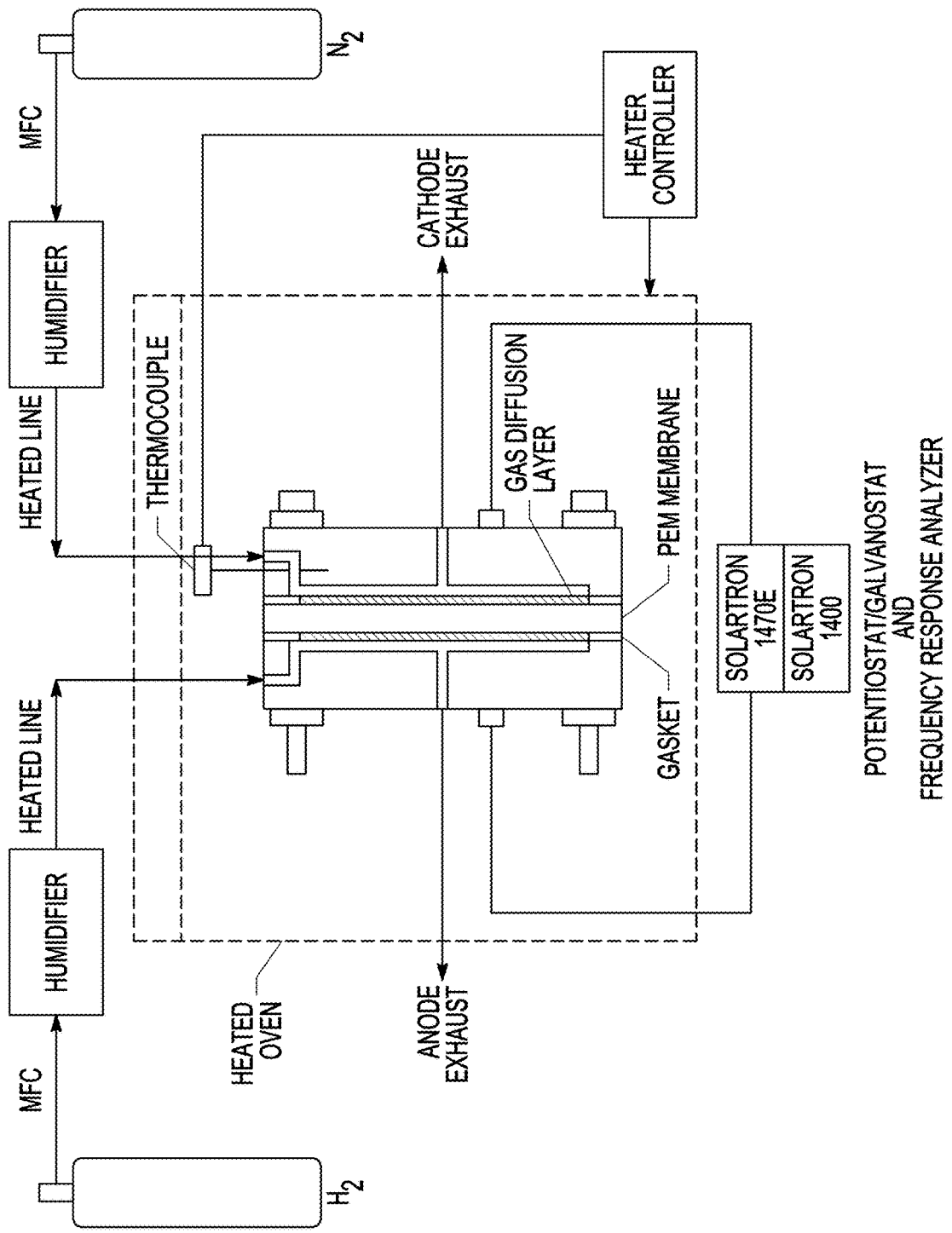
FIG. 5 illustrates a proton conductivity test apparatus, in accordance with various embodiments.

Proton conductivity (PC) measurements were conducted on two membrane test samples cut from a single large membrane sheet. Alternating current impedance (ACI) spectroscopy—conducted with a Solartron 1470E Potentiostat/Galvanostat and Solartron 1400 Frequency Response Analyzer—was used for measuring membrane PC. FIG. 5 depicts the PC measurement test apparatus. The test procedure measured changes in ACI in response to a voltage amplitude of 10 mV applied over a frequency range of $10^{-1}$ to $10^6$ Hz. Data are reported in a Nyquist plot, which is the complex plane (Z',°Z"), and analyzed after establishing an equivalent circuit model to represent the dynamic characteristics of the system. High-frequency Nyquist plat data correspond to the combination of bulk resistance (R) and capacitance of the polymeric film-electrode system. PC of the samples was calculated using the following formula:

$$\sigma = \frac{L}{RA}$$

where σ is PC in siemens/cm (S cm$^{-1}$), L is the thickness (in cm) of the polymer film, A is the contact area between the electrodes and the polymer film (about 3.45 cm$^2$), R is the bulk membrane resistance (Ω) calculated by an equivalent circuit model fitted from the ACI spectroscopy-generated Nyquist plot.

Figure 6:
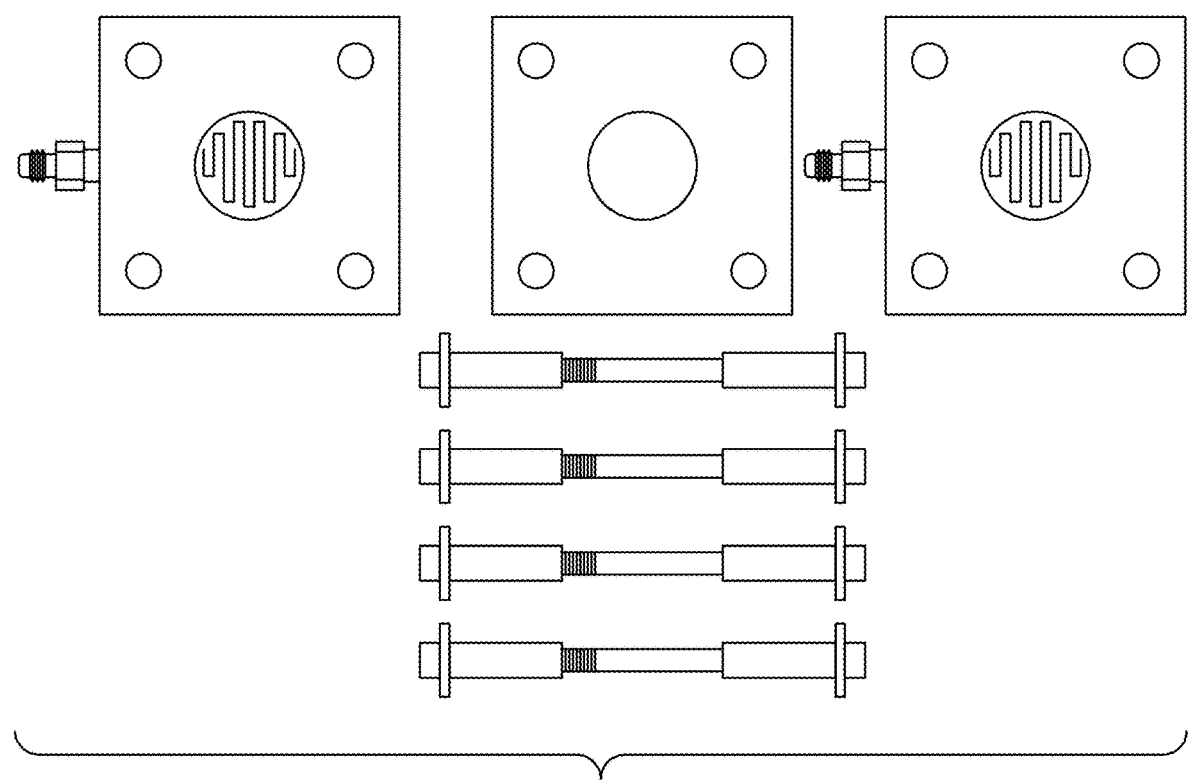
FIG. 6 illustrates a unit cell fixture and gasket for proton conductivity testing, in accordance with various embodiments.

Each membrane was mounted, along with a gasket set and gas diffusion layers, in the unit-cell (fuel cell) hardware shown in FIG. 6. A membrane sample of 2.8 cm$^2$ area and 0.015 cm thickness was placed between two 0.01-cm-thick gas diffusion layers. This sandwiched structure was then surrounded by two gaskets. The gaskets were cut with a razor mold to match the dimensions of the membrane sample and fuel cell hardware. The middle circle piece of each gasket was taken out so that it properly fit around the sandwiched membrane, thereby ensuring that when compressed the gaskets formed a tight seal around the membrane perimeter. Once the membrane sample was loaded in the unit cell, the unit-cell fixture was checked to confirm proper loading and ensure against the occurrence of an electrical short circuit.

The unit-cell fixture was mounted in a furnace on the test setup. The proton conductivity test was conducted under 50 sccm hydrogen flow on the anode side and 50 sccm nitrogen flow on the cathode side. Once gas flow was established, the furnace temperature was raised to the desired test temperature. Humidity was introduced into the gas stream after the cell temperate reached 100° C. At test temperature, a Nyquist plot was obtained. Bulk membrane resistance (Ω) was determined using an equivalent circuit model fitted from the Nyquist plot, and used to calculate membrane PC. Both membranes were found to have proton conductivities of $0.2 \times 10^{-3}$ S/cm at both 300° C. and 350° C.

Example 2. Formation of Membrane Including Matted Nanofibers with PBI Core and CTHG Shell/Coating PBI nanofibers were prepared by electrospinning (versus co-electrospinning as used for core-shell nanofiber preparations). A solution of 18 wt % PBI in DMAc was electrospun into matted PBI nanofibers at a voltage of ~18-25 kV, a feeding rate of 0.5 mL/hour, and a tip-to-collector distance of ~20 cm. The diameter of PBI nanofibers was ~300-500 nm. The as-spun PBI nanofiber mat was then transferred into a vacuum oven and dried at a temperature of 110° C. under a vacuum of ~-27 inches mercury. The dried PBI nanofiber mat was immersed in a solution of 80 wt % CTHG in water for 6 hours at room temperature. The mat was removed from solution and dried in air for 48 hours. The dried PBI nanofiber mat coated with CTHG was pressed at a pressure of 1000 psi at room temperature for 2 minutes to obtain a membrane with a thickness of ~200 microns. Using the proton conductivity test procedure described in Example 1, two separate small membrane samples (cut from the larger membrane sheet) were evaluated. Both samples exhibited a proton conductivity at 300° C. of about $0.1 \times 10^{-2}$ S/cm. One sample was held at 300° C. under test conditions for 24 hours, during which proton conductivity was maintained at $0.1 \times 10^{-2}$ S/cm.

Example 3. Cerium Ultraphosphate (CUP) Synthesis 8.5 grams $NH_4H_2PO_4$ in were placed in a platinum-gold crucible. The Pt—Au helped to prevent bonding of reactants and/or product to crucible interior surface during heat treatment. 1.3 grams $CeO_2$ were weighed into a plastic weigh dish. $CeO_2$ was poured evenly over the $NH_4H_2PO_4$ in crucible. The crucible was placed into a high-temperature furnace and treated under the following regime: 300° C. for 2.5 hours, 400° C. for 1 hour, 800° C. for 20 hours, and 500° C. for 3 hours. The crucible was removed from the furnace and cooled to room temperature under air. The CUP ($CeP_5O_{14}$) product (about 3.5 grams) was removed from the crucible. Using a ball mill, the CUP was ground into a powder having a particle size of 400 nm.

Example 4. CUP-Based Polymer-Inorganic Composite Membrane Configuration 1 (MC1)

MC1 included CUP particles distributed throughout a polybenzimidazole (PBI) matrix. MC1 was produced via high-pressure compaction of a doughy mixture of CUP powder and PBI solution to yield a thin disk/membrane, using the following procedure. 2.0 grams CUP powder were placed into a small mixing bowl. 0.7 grams 10% PBI solution (10 weight % PBI in 90 weight % dimethylacetamide [DMAc]) were added to CUP powder. Mixing was performed to yield a homogeneous dough. The dough was dried at room temperature for 12 hours. Using a mortar and pestle, the dried dough was crushed into a powder. The procedure was repeated one more time using the CUP+PBI powder. To the resulting CUP+PBI powder, a few drops of DMAc were added and mixing was performed to yield a slightly moist granular dough. The dough was barely pliable, but still homogeneous and moldable. The resulting CUP+PBI+DMAc dough was added into a 1.25-inch-diameter metal die/mold and pressed at 16,000 pounds/inch pressure for 5 minutes to yield a CUP-based polymer-inorganic composite thin disk/membrane. The membrane was dried at room temperature for 24 hours to ensure maximum removal/vaporization of any residual DMAc.

Example 5. CUP-Based Polymer-Inorganic Composite Membrane Configuration 2 (MC2)

Like MC1, MC2 includes CUP particles distributed throughout a polybenzimidazole (PBI) matrix. However, MC2 is produced via "film casting" a mixture including CUP particles suspended in a PBI solution via the following procedure. Using a ball mill, CUP powder is ground to a maximum particle diameter of 400 nanometers. Using an analog centrifugal stirrer, sonication bath, ultrasonic horn, or other appropriate mixing device, CUP particles are dispersed into DMAc to form a stable colloidal suspension of CUP in DMAc. A solution of 26% weight % PBI in DMAc (procurable from PBI Performance Products Inc., Charlotte, North Carolina) was placed into CUP–DMAc colloidal suspension. An analog stirrer and slight heating is used, as needed, to yield homogeneous CUP–PBI–DMAc mixture with well-dispersed CUP particles. The CUP–PBI–DMAc mixture is applied onto flat glass, aluminum, steel, or other metal panel and a doctor blade, film-casting knife, or drawdown bar is used to cast a membrane with a uniform thickness of 0.04 to 2 mm. The membrane is dried in room temperature air for at least 12 hours.

Example 6. CUP-Based Polymer-Inorganic Composite Membrane Configuration 3 (MC3)

MC3 includes CUP–PBI nanofibers produced via electrospinning a colloidal suspension of CUP particles in a PBI-in-DMAc solution via the following procedure. Using a ball mill, CUP powder is ground to a maximum particle diameter of 400 nanometers. Using an analog centrifugal stirrer, sonication bath, ultrasonic horn, or other appropriate mixing device, CUP particles are dispersed into DMAc to form a stable colloidal suspension of CUP in DMAc. A solution of 26% weight % PBI in DMAc (procurable from PBI Performance Products Inc., Charlotte, North Carolina) is added into CUP–DMAc colloidal suspension. An analog stirrer and slight heating is used as needed to yield homogeneous CUP–PBI–DMAc mixture with well-dispersed CUP particles. The CUP–PBI–DMAc mixture is electrospun to yield nanofibers with diameter of about 150-300 nanometers and collect nanofibers as a nonwoven mat. The mat is subjected to appropriate heat-pressing treatment to yield the polymer-inorganic composite membrane.

Example 7. Proton Conductivity Measurement of CUP-Based Polymer-Inorganic Composite MC1

Proton conductivity of an MC1 sample was measured using the apparatus described in Example 1. FIG. 5 depicts the PC measurement test apparatus. MC1 was mounted, along with a gasket set and gas diffusion layers, in the unit-cell (fuel cell) hardware shown in FIG. 6. A membrane sample including 94% CUP-6% PBI with an area of 7.8 cm$^2$ and thickness of 1.2 mm was placed between two 0.1-mm-thick gas diffusion layers. This sandwiched structure was then surrounded by two gaskets. The gaskets were cut with a razor mold to match the dimensions of the membrane sample and fuel cell hardware. The middle circle piece of each gasket was taken out so that it properly fit around the sandwiched membrane, thereby ensuring that when compressed the gaskets formed a tight seal around the membrane perimeter. Once the membrane sample was loaded in the unit cell, the unit-cell fixture was checked to confirm proper loading and ensure against the occurrence of an electrical short circuit.

Figure 7:
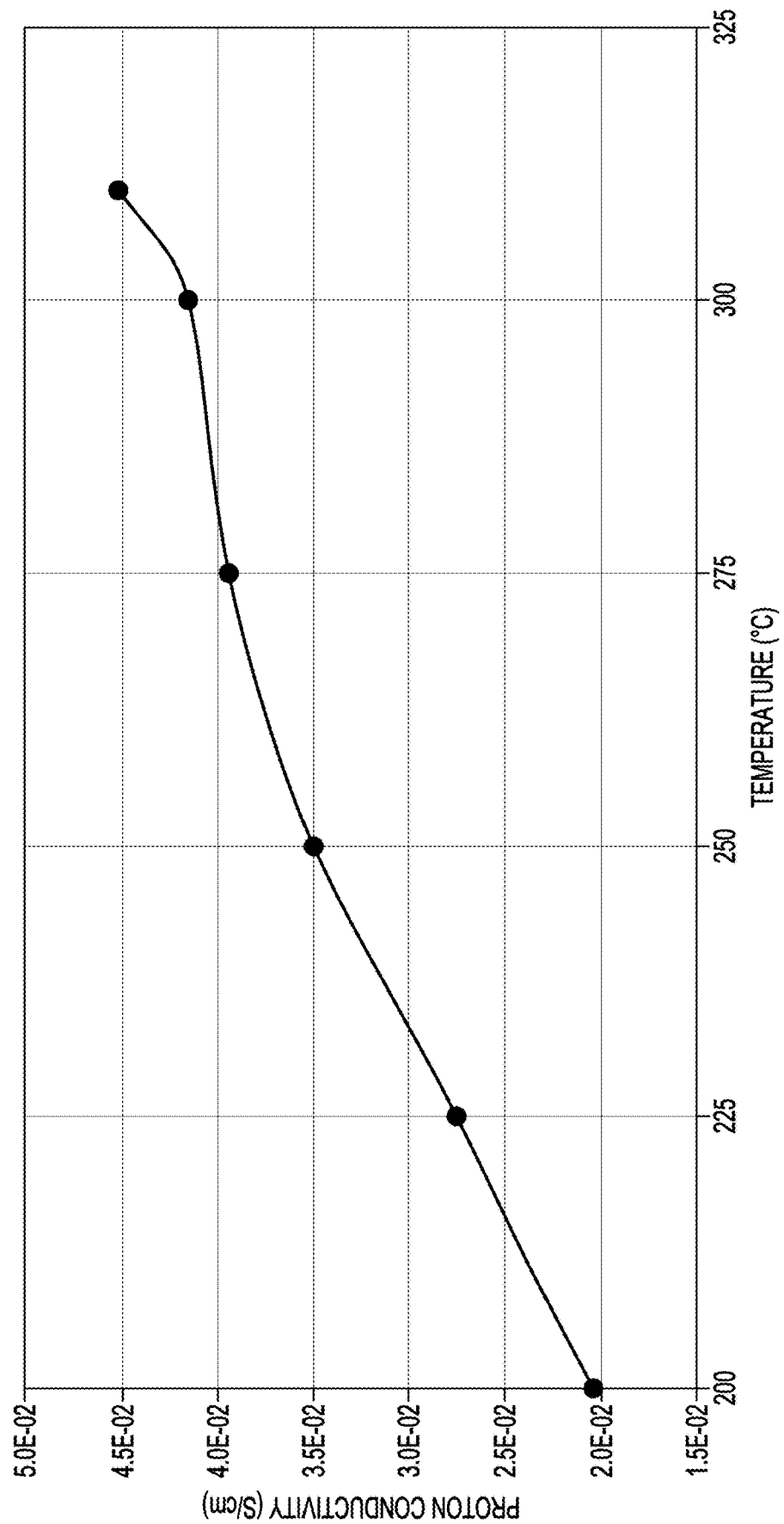
FIG. 7 illustrates proton conductivity versus time for a membrane sample including 94% CUP/6% PBI, in accordance with various embodiments.
Figure 8:
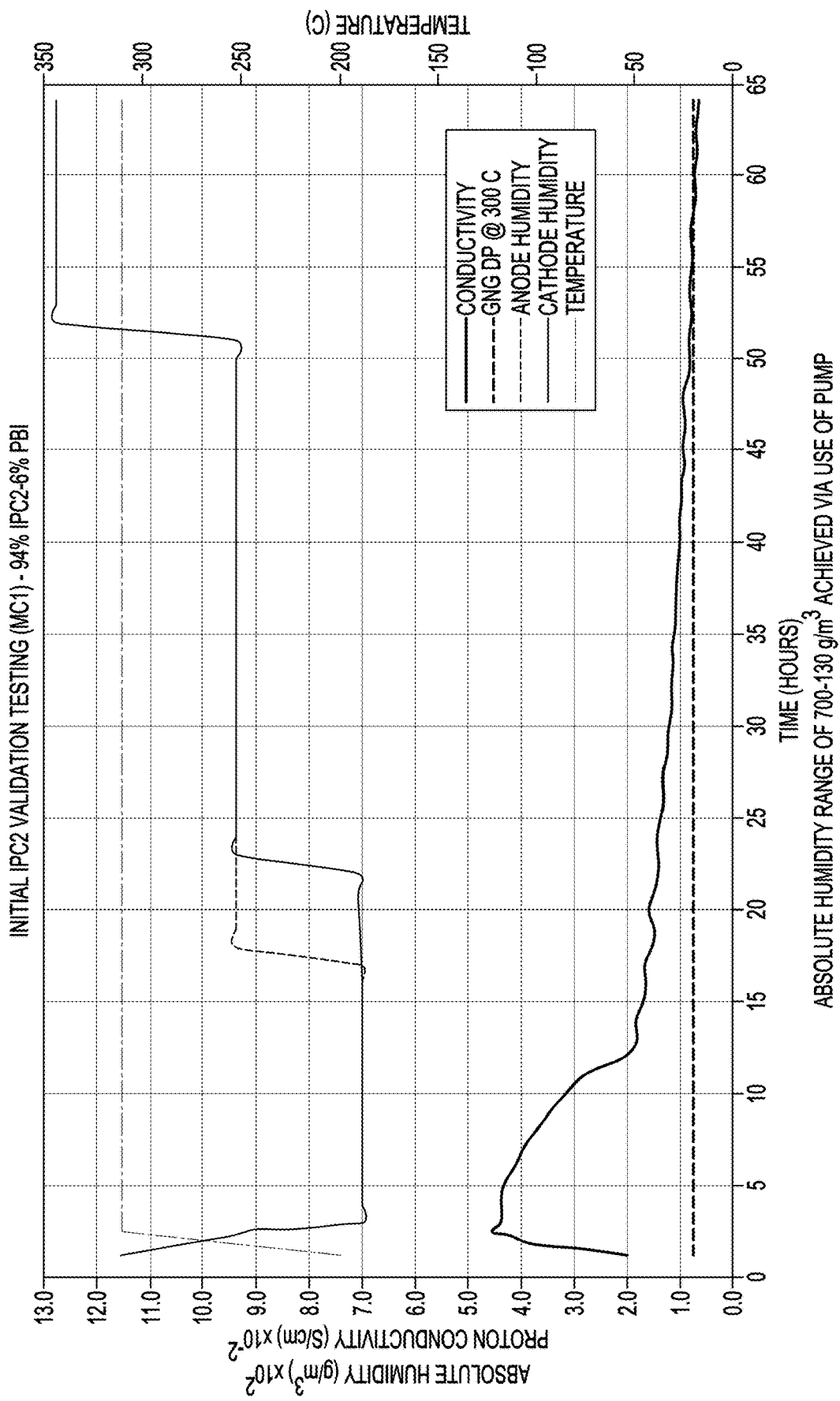
FIG. 8 illustrates proton conductivity versus time for a membrane sample including 94% CUP/6% PBI, in accordance with various embodiments.
Figure 9:
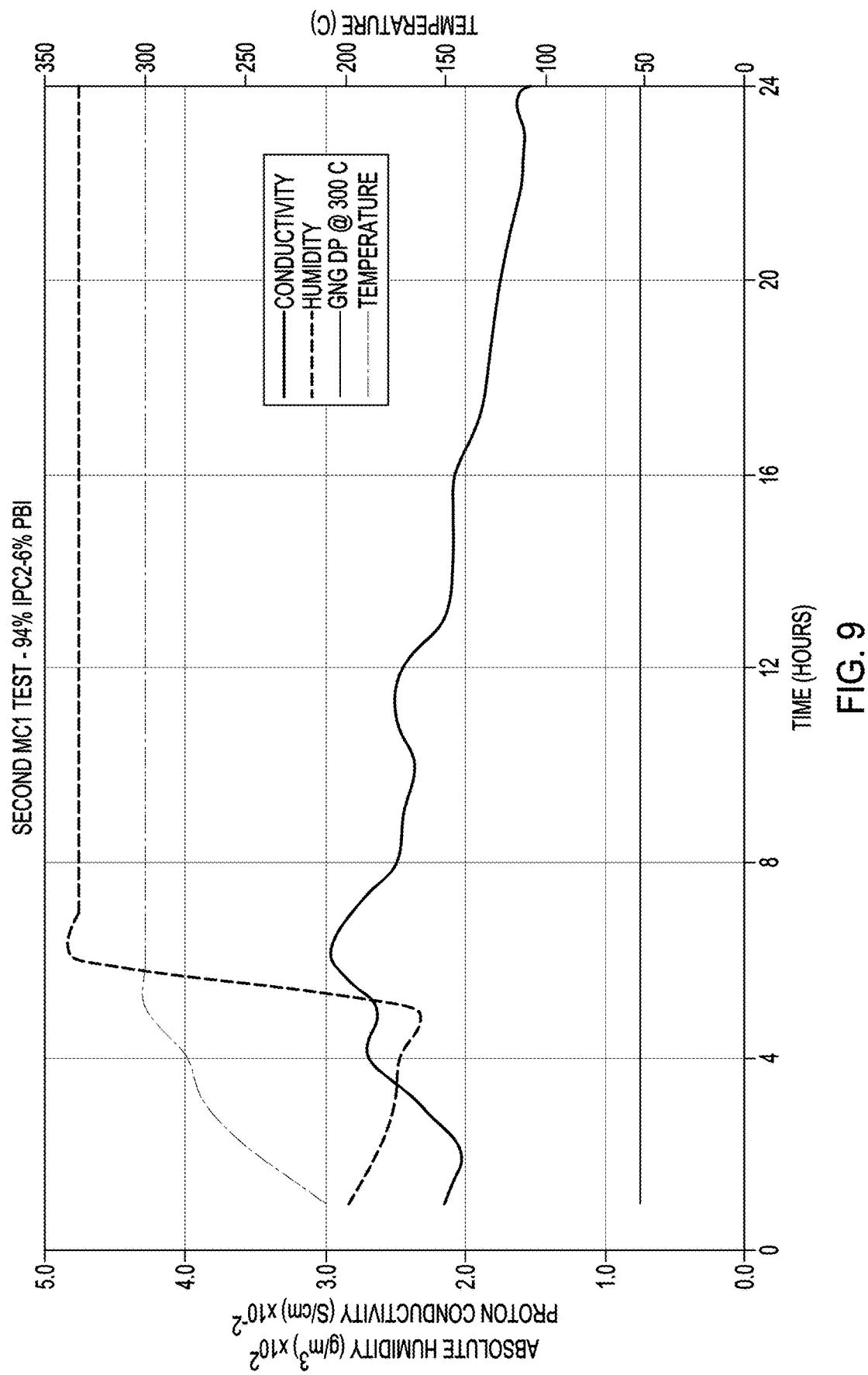
FIG. 9 illustrates proton conductivity versus time for a membrane sample including 94% CUP/6% PBI, in accordance with various embodiments.

The unit-cell fixture was mounted in a furnace on the test setup. Proton conductivity testing was conducted under 100 sccm hydrogen flow on the anode side and 100 sccm nitrogen flow on the cathode side. Once gas flow was established, furnace temperature was slowly and steadily raised to 310° C. After exceeding 100° C., humidity flow (at a rate equivalent to 0.2-mm/minute liquid water at room temperature) was introduced into both anode and cathode gas streams. At each test temperature, a Nyquist plot was obtained. Bulk membrane resistance ($\Omega$) was determined using an equivalent circuit model fitted from the Nyquist plot, and used to calculate membrane PC. Temperature-based proton conductivity values are plotted in FIG. 7. Additional testing of two different MC1 membranes are plotted in FIGS. 8 and 9, with both figures illustrating data for a membrane having 94% CUP and 6% PBI. The humidity conditions were different for FIG. 8 versus FIG. 9.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Embodiments

The following exemplary embodiments are provided, the numbering of which is not to be construed as designating levels of importance:

Embodiment 1 provides a proton-exchange membrane comprising:
    a polymer matrix, polymer fibers, or a combination thereof; and
    a proton-conducting material distributed in the polymer matrix, on the polymer fibers, in the polymer fibers, or a combination thereof.

Embodiment 2 provides the proton-exchange membrane of Embodiment 1, wherein the polymer matrix, polymer fibers, or a combination thereof is about 0.01 wt % to about 99 wt % of the membrane.

Embodiment 3 provides the proton-exchange membrane of any one of Embodiments 1-2, wherein the polymer matrix, polymer fibers, or a combination thereof is about 5 wt % to about 80 wt % of the membrane.

Embodiment 4 provides the proton-exchange membrane of any one of Embodiments 1-3, wherein the proton-conducting material is about 0.01 wt % to about 99.99 wt % of the membrane.

Embodiment 5 provides the proton-exchange membrane of any one of Embodiments 1-4, wherein the proton-conducting material is about 20 wt % to about 95 wt % of the membrane.

Embodiment 6 provides the method of any one of Embodiments 1-5, wherein the proton-conducting material is a proton-conducting inorganic material.

Embodiment 7 provides the membrane of any one of Embodiments 1-6, wherein the polymer fibers have a diameter of about 1 nm to about 1 mm.

Embodiment 8 provides the membrane of any one of Embodiments 1-7, wherein the polymer fibers have a diameter of about 1 nm to about 1,000 nm.

Embodiment 9 provides the membrane of any one of Embodiments 1-8, wherein the membrane comprises particles of the proton-conducting material.

Embodiment 10 provides the membrane of Embodiment 9, wherein the particles of the proton-conducting material are homogeneously distributed in the polymer matrix.

Embodiment 11 provides the membrane of any one of Embodiments 9-10, wherein the particles of the proton-conducting material have a particle size of about 1 nm to about 500 microns.

Embodiment 12 provides the membrane of any one of Embodiments 9-11, wherein the particles of the proton-conducting material have a particle size of about 1 nm to about 1,000 nm.

Embodiment 13 provides the membrane of any one of Embodiments 1-12, wherein the membrane comprises the polymer fibers with the proton-conducting material distributed on the polymer fibers.

Embodiment 14 provides the membrane of Embodiment 13, wherein the proton-conducting material is homogeneously distributed on the polymer fibers.

Embodiment 15 provides the membrane of any one of Embodiments 13-14, wherein the membrane comprises a coating of the proton-conducting material on the polymer fibers.

Embodiment 16 provides the membrane of Embodiment 15, wherein the membrane comprises a particulate coating of the proton-conducting material on the polymer fibers.

Embodiment 17 provides the membrane of any one of Embodiments 13-16, wherein the polymer fibers having the proton-conducting material thereon are matted together in an orientation that is substantially parallel to a plane of the membrane.

Embodiment 18 provides the membrane of any one of Embodiments 1-17, wherein the membrane comprises the polymer fibers with the proton-conducting material distributed in the polymer fibers.

Embodiment 19 provides the membrane of Embodiment 18, wherein the proton-conducting material is homogeneously distributed in the polymer fibers.

Embodiment 20 provides the membrane of any one of Embodiments 18-19, wherein the proton-conducting material is about 0.01 wt % to about 99.99 wt % of the polymer fibers.

Embodiment 21 provides the membrane of any one of Embodiments 18-20, wherein the proton-conducting material is about 20 wt % to about 95 wt % of the polymer fibers.

Embodiment 22 provides the membrane of any one of Embodiments 18-21, wherein the membrane comprises particulates of the proton-conducting material distributed in the polymer fibers.

Embodiment 23 provides the membrane of any one of Embodiments 18-22, wherein the polymer fibers having the proton-conducting material therein are matted together in an orientation that is substantially parallel to a plane of the membrane.

Embodiment 24 provides the membrane of any one of Embodiments 18-23, wherein each polymer fiber comprises a polymer that is continuous along a length of the polymer fiber.

Embodiment 25 provides the membrane of any one of Embodiments 1-24, wherein the membrane comprises the polymer matrix with the proton-conducting material distributed in the polymer matrix.

Embodiment 26 provides the membrane of Embodiment 25, wherein the proton-conducting material is about 90 wt % to 99 wt % of the membrane.

Embodiment 27 provides the membrane of any one of Embodiments 25-26, wherein the membrane comprises particles of the proton-conducting material distributed in the polymer matrix.

Embodiment 28 provides the membrane of any one of Embodiments 25-27, wherein the membrane comprises a composite comprising the polymer matrix and the proton-conducting particles.

Embodiment 29 provides the membrane of any one of Embodiments 25-28, wherein the membrane is substantially free of the polymer fibers.

Embodiment 30 provides the membrane of any one of Embodiments 25-29, wherein the membrane is substantially free of nanofibers of the proton-conducting material.

Embodiment 31 provides the membrane of any one of Embodiments 25-30, wherein the proton-conducting material comprises proton-conducting nanofibers.

Embodiment 32 provides the membrane of Embodiment 31, wherein each proton-conducting nanofiber comprises a proton-conducting inorganic material that is continuous along a length of the nanofiber.

Embodiment 33 provides the membrane of any one of Embodiments 31-32, wherein the membrane comprises a composite comprising the polymer matrix and the proton-conducting nanofibers.

Embodiment 34 provides the membrane of any one of Embodiments 31-33, wherein the nanofibers are matted together in an orientation that is substantially parallel to a plane of the membrane.

Embodiment 35 provides the membrane of any one of Embodiments 31-34, wherein each nanofiber is aligned substantially perpendicularly to a plane of the membrane.

Embodiment 36 provides the membrane of Embodiment 35, wherein each nanofiber is aligned within about 0-30 degrees of the direction perpendicular to the plane of the membrane.

Embodiment 37 provides the membrane of any one of Embodiments 35-36, wherein each nanofiber is aligned within about 0-10 degrees of the direction perpendicular to the plane of the membrane.

Embodiment 38 provides the membrane of any one of Embodiments 31-37, wherein each nanofiber is continuous from one major face of the membrane to another major face of the membrane.

Embodiment 39 provides the membrane of any one of Embodiments 1-38, wherein the membrane is gas-impermeable and liquid-impermeable.

Embodiment 40 provides the membrane of any one of Embodiments 1-39, wherein the membrane is electrically insulating.

Embodiment 41 provides the membrane of any one of Embodiments 1-40, wherein the membrane has a thickness of about 100 nm to about 1 cm.

Embodiment 42 provides the membrane of any one of Embodiments 1-41, wherein the membrane has a thickness of about 0.001 cm to about 0.05 cm.

Embodiment 43 provides the membrane of any one of Embodiments 1-42, wherein a major face of the membrane has an area of about 0.0001 $cm^2$ to about 1,000 $m^2$.

Embodiment 44 provides the membrane of any one of Embodiments 1-43, wherein a major face of the membrane has an area of about 1 $cm^2$ to about 10 $cm^2$.

Embodiment 45 provides the membrane of any one of Embodiments 1-44, wherein the membrane has a uniform thickness.

Embodiment 46 provides the membrane of any one of Embodiments 1-45, wherein the polymer matrix, the polymer fibers, or a combination thereof, comprise a heat-resistant synthetic polymer.

Embodiment 47 provides the membrane of Embodiment 46, wherein the heat-resistant polymer is about 20 wt % to about 100 wt % of the polymer matrix, the polymer fibers, or a combination thereof.

Embodiment 48 provides the membrane of any one of Embodiments 46-47, wherein the heat-resistant polymer is about 95 wt % to about 100 wt % of the polymer matrix, the polymer fibers, or a combination thereof.

Embodiment 49 provides the membrane of any one of Embodiments 46-48, wherein the heat-resistant polymer is a polyimide, a polybenzoxazole, a polybenzimidazole, a polybenzthiazole, a ladder polymer, a polymer including cyclotriphosphazene, a polysialate, or a combination thereof.

Embodiment 50 provides the membrane of any one of Embodiments 46-49, wherein the heat-resistant polymer is polybenzimidazole (PBI).

Embodiment 51 provides the membrane of any one of Embodiments 46-50, wherein the heat-resistant polymer is a polybenzimidazole homopolymer.

Embodiment 52 provides the membrane of any one of Embodiments 46-51, wherein the heat-resistant polymer is a polybenzimidazole copolymer.

Embodiment 53 provides the membrane of any one of Embodiments 31-52, wherein the nanofibers are homogeneously distributed across major faces of the membrane.

Embodiment 54 provides the membrane of any one of Embodiments 31-53, wherein the nanofibers are parallel to one another.

Embodiment 55 provides the membrane of any one of Embodiments 31-54, wherein the nanofibers are aligned parallel to one another within about 0-30 degrees.

Embodiment 56 provides the membrane of any one of Embodiments 31-55, wherein the nanofibers are aligned parallel to one another with about 0-10 degrees.

Embodiment 57 provides the membrane of any one of Embodiments 31-56, wherein the nanofibers contact one another.

Embodiment 58 provides the membrane of any one of Embodiments 31-57, wherein the nanofibers are free of contact with one another.

Embodiment 59 provides the membrane of any one of Embodiments 31-58, wherein the polymer matrix separates the nanofibers from one another.

Embodiment 60 provides the membrane of any one of Embodiments 32-59, wherein the proton-conducting inorganic material has a largest dimension perpendicular to a longitudinal direction of about 1 nm to about 1,000 nm.

Embodiment 61 provides the membrane of any one of Embodiments 32-60, wherein the proton-conducting inorganic material has a largest dimension perpendicular to a longitudinal direction of about 50 nm to about 250 nm.

Embodiment 62 provides the membrane of any one of Embodiments 31-61, wherein the nanofibers have a uniform composition.

Embodiment 63 provides the membrane of any one of Embodiments 31-62, wherein the nanofibers have a core-shell structure, wherein the core has a different composition than the shell.

Embodiment 64 provides the membrane of any one of Embodiments 32-63, wherein the nanofibers each comprise a polymer shell that surrounds the proton-conducting inorganic material, wherein the polymer shell is continuous along a length of the nanofiber.

Embodiment 65 provides the membrane of any one of Embodiments 32-64, wherein the nanofibers comprise
 a core comprising the proton-conducting inorganic material; and
 a shell that is continuous along a length of the nanofiber, the shell having the same or different composition as the polymer matrix.

Embodiment 66 provides the membrane of Embodiment 65, wherein the shell has a thickness of about 1 nm to about 1,000 nm.

Embodiment 67 provides the membrane of any one of Embodiments 65-66, wherein the shell has a thickness of about 250 nm to about 550 nm.

Embodiment 68 provides the membrane of any one of Embodiments 32-67, wherein the nanofibers each comprise
 a proton-conducting shell comprising the proton-conducting inorganic material; and
 a polymer core that has the same or different composition as the polymer matrix, wherein the polymer core is continuous along a length of the nanofiber.

Embodiment 69 provides the membrane of Embodiment 68, wherein the shell has a thickness of about 1 nm to about 1,000 nm.

Embodiment 70 provides the membrane of any one of Embodiments 68-69, wherein the shell has a thickness of about 250 nm to about 550 nm.

Embodiment 71 provides the membrane of any one of Embodiments 68-70, wherein the core has a largest dimension perpendicular to a longitudinal direction of about 1 nm to about 1,000 nm.

Embodiment 72 provides the membrane of any one of Embodiments 68-71, wherein the core has a largest dimension perpendicular to a longitudinal direction of about 50 nm to about 250 nm.

Embodiment 73 provides the membrane of any one of Embodiments 31-72, wherein the nanofibers have a density on major faces of the membrane of about 1 nanofibers/$\mu m^2$ to about 100,000 nanofibers/$\mu m^2$.

Embodiment 74 provides the membrane of any one of Embodiments 32-73, wherein the nanofibers consist of the proton-conducting inorganic material.

Embodiment 75 provides the membrane of any one of Embodiments 32-74, wherein the proton-conducting inorganic material is about 50 wt % to about 100 wt % of the nanofibers, of a core of the nanofibers, or of a shell of the nanofibers.

Embodiment 76 provides the membrane of any one of Embodiments 32-75, wherein the proton-conducting inorganic material is about 95% to about 100 wt % of the nanofibers, or a core of the nanofibers, or of a shell of the nanofibers.

Embodiment 77 provides the membrane of any one of Embodiments 6-76, wherein the proton-conducting inorganic material comprises an alkali thio-hydroxo metal, an alkali thio-hydroxo metalloid, a pyrophosphate, an ultraphosphate, or a combination thereof.

Embodiment 78 provides the membrane of any one of Embodiments 6-77, wherein the proton-conducting inorganic material comprises an alkali thio-hydroxo metalloid.

Embodiment 79 provides the membrane of any one of Embodiments 6-78, wherein the proton-conducting inorganic material comprises an alkali thio-hydroxogermanate (ATHG).

Embodiment 80 provides the membrane of any one of Embodiments 6-79, wherein the proton-conducting inorganic material has a chemical formula of $M_xGeS_x(OH)_{4-x} \cdot yH_2O$, wherein M is an alkali metal, wherein x is 1 to 4, and wherein y is 0 to 8.

Embodiment 81 provides the membrane of Embodiment 80, wherein M is Na, K, Rb, or Cs.

Embodiment 82 provides the membrane of Embodiment 80, wherein M is Cs.

Embodiment 83 provides the membrane of any one of Embodiments 6-82, wherein the proton-containing inorganic material comprises a dopant.

Embodiment 84 provides the membrane of any one of Embodiments 83, wherein the dopant comprises indium.

Embodiment 85 provides the membrane of any one of Embodiments 6-84, wherein the proton-conducting material comprises cesium thio-hydroxogermanate (CTHG).

Embodiment 86 provides the membrane of any one of Embodiments 6-85, wherein the proton-conducting inorganic material comprises an ultraphosphate, a pyrophosphate, or a combination thereof.

Embodiment 87 provides the membrane of any one of Embodiments 6-86, wherein the proton-conducting inorganic material comprises cerium ultraphosphate, cesium ultraphosphate, lanthanum ultraphosphate, neodymium ultraphosphate, samarium ultraphosphate, dysprosium ultraphosphate, gadolinium ultraphosphate, tin pyrophosphate, titanium pyrophosphate, silicon pyrophosphate, germanium pyrophosphate, cerium pyrophosphate, cerium pyrophosphate, zirconium pyrophosphate, or a combination thereof.

Embodiment 88 provides the membrane of any one of Embodiments 6-87, wherein the proton-conducting inorganic material comprises cerium ultraphosphate, cesium ultraphosphate, or a combination thereof.

Embodiment 89 provides the membrane of any one of Embodiments 6-88, wherein the proton-conducting inorganic material comprises cerium ultraphosphate.

Embodiment 90 provides the membrane of any one of Embodiments 31-89, wherein the nanofibers have a length that is equal to a thickness of the membrane.

Embodiment 91 provides the membrane of any one of Embodiments 31-90, wherein at least some of the nanofibers have a length that is greater than a thickness of the membrane.

Embodiment 92 provides the membrane of any one of Embodiments 1-91, wherein the membrane has a proton conductivity from one major face of the membrane to another major face of the membrane of at least $10^{-4}$ S/cm.

Embodiment 93 provides the membrane of Embodiment 92, wherein the membrane has a proton conductivity from one of the major faces of the membrane to the other major face of the membrane of at least $10^{-3}$ S/cm.

Embodiment 94 provides the membrane of any one of Embodiments 92-93, wherein the membrane has as proton conductivity from one of the major faces of the membrane to the other major face of the membrane of about $10^{-6}$ S/cm to about $10^{-1}$ S/cm.

Embodiment 95 provides the membrane of any one of Embodiments 92-94, wherein the membrane has as proton conductivity from one of the major faces of the membrane to the other major face of the membrane of about $5 \times 10^{-5}$ S/cm to about $1 \times 10^{-1}$ S/cm.

Embodiment 96 provides the membrane of any one of Embodiments 92-95, wherein the proton conductivity of the membrane is sustainable at temperatures of ≥450° C.

Embodiment 97 provides the membrane of any one of Embodiments 92-96, wherein the proton conductivity of the membrane is sustainable at temperatures of ≥400° C.

Embodiment 98 provides the membrane of any one of Embodiments 92-97, wherein the proton conductivity of the membrane is sustainable at temperatures of ≥350° C.

Embodiment 99 provides the membrane of any one of Embodiments 92-98, wherein the proton conductivity of the membrane is sustainable at temperatures of ≥300° C.

Embodiment 100 provides the membrane of any one of Embodiments 92-99, wherein the proton conductivity of the membrane is sustainable at temperatures of ≥200° C.

Embodiment 101 provides the membrane of any one of Embodiments 92-100, wherein the proton conductivity of the membrane is sustainable at temperatures of at least ≥200 to ≤450° C.

Embodiment 102 provides the membrane of any one of Embodiments 92-101, wherein the proton conductivity of the membrane is sustainable at temperatures of at least ≥200 to ≤400° C.

Embodiment 103 provides the membrane of any one of Embodiments 92-102, wherein the proton conductivity of the membrane is sustainable at temperatures of at least ≥200 to ≤350° C.

Embodiment 104 provides the membrane of any one of Embodiments 92-103, wherein the proton conductivity of the membrane is sustainable at temperatures of at least ≥200 to ≤300° C.

Embodiment 105 provides a proton-exchange membrane comprising:
- a polymer matrix comprising polybenzimidazole (PBI); and
- proton-conducting nanofibers distributed in the polymer matrix, wherein each nanofiber is aligned perpendicularly to a plane of the membrane, each nanofiber comprising
  - a core that is continuous along a length of the nanofiber and that comprises a proton-conducting inorganic material, the proton-conducting inorganic material comprising an alkali thio-hydroxogermanate (ATHG), an ultraphosphate, a pyrophosphate, or a combination thereof, and
  - a shell that is continuous along the length of the nanofiber, the shell comprising polybenzimidazole (PBI);
- wherein each nanofiber is continuous from one major face of the membrane to another major face of the membrane.

Embodiment 106 provides a proton-exchange membrane comprising:
- a polymer matrix comprising polybenzimidazole (PBI); and proton-conducting nanofibers distributed in the polymer matrix, each nanofiber comprising
  a core that is continuous along a length of the nanofiber and that comprises a proton-conducting inorganic material, the proton-conducting inorganic material comprising an alkali thio-hydroxogermanate (ATHG), an ultraphosphate, a pyrophosphate, or a combination thereof, and
  a shell that is continuous along the length of the nanofiber, the shell comprising polybenzimidazole (PBI).

Embodiment 107 provides a proton-exchange membrane comprising:
  a polymer matrix comprising polybenzimidazole (PBI); and
  particles comprising a proton-conducting material homogeneously distributed in the polymer matrix, the proton-conducting material comprising an alkali thio-hydroxogermanate (ATHG), an ultraphosphate, a pyrophosphate, or a combination thereof.

Embodiment 108 provides a proton-exchange membrane comprising:
  polymer fibers comprising polybenzimidazole (PBI); and
  a proton-conducting material distributed on the polymer fibers, wherein the proton-conducting material comprises an alkali thio-hydroxogermanate (ATHG), an ultraphosphate, a pyrophosphate, or a combination thereof;
  wherein the polymer fibers having the proton-conducting material thereon are matted together in an orientation that is substantially parallel to a plane of the membrane.

Embodiment 109 provides a proton-exchange membrane comprising:
  polymer fibers comprising polybenzimidazole (PBI); and
  particles comprising a proton-conducting material homogeneously distributed in the polymer fibers, the proton-conducting material comprising an alkali thio-hydroxogermanate (ATHG), an ultraphosphate, a pyrophosphate, or a combination thereof;
  wherein the polymer fibers having the proton-conducting material thereon are matted together in an orientation that is substantially parallel to a plane of the membrane.

Embodiment 110 provides an ammonia-forming apparatus comprising the membrane of any one of Embodiments 1-109.

Embodiment 111 provides a water-electrolysis apparatus comprising the membrane of any one of Embodiments 1-109.

Embodiment 112 provides an electrochemical cell comprising:
  an anode;
  a cathode; and
  a membrane separating the anode and the cathode, the membrane comprising the membrane of any one of Embodiments 1-109.

Embodiment 113 provides the electrochemical cell of Embodiment 112, wherein the electrochemical cell is a fuel cell.

Embodiment 114 provides a method of using the membrane of any one of Embodiments 1-109, the method comprising:
  conducting protons from one major face of the membrane to another major face with a conductivity of $10^{-6}$ S/cm to about $10^{-1}$ S/cm while the membrane is at a temperature of $\geq 200$ to $\leq 450°$ C.

Embodiment 115 provides a method of using the membrane of any one of Embodiments 1-109, the method comprising:
  conducting protons from one major faces of the membrane to another major face with a conductivity of $5\times10^{-5}$ S/cm to about $1\times10^{-1}$ S/cm while the membrane is at a temperature of $\geq 200$ to $\leq 450°$ C.

Embodiment 116 provides a method of making the membrane of any one of Embodiments 1-109, the method comprising:
  co-electrospinning a solution comprising the proton-conducting inorganic material and a solution comprising a heat-resistant polymer to form core-shell nanofibers comprising a core that comprises the proton-conducting inorganic material and comprising a polymer shell that has the same or different composition as the polymer matrix; and
  heat pressing the nanofibers to form the membrane.

Embodiment 117 provides the method of Embodiment 116, wherein the heat pressing comprises heat pressing with a heat-resistant polymer.

Embodiment 118 provides the method of any one of Embodiments 116-117, wherein a coaxial nozzle is used during the co-electrospinning to form the core-shell nanofibers.

Embodiment 119 provides the method of any one of Embodiments 116-118, further comprising aligning the nanofibers perpendicular to a plane of the membrane before the heat pressing.

Embodiment 120 provides a method of making the membrane of any one of Embodiments 1-109, the method comprising:
  forming core-shell nanofibers comprising a core and shell, the forming comprising electrospinning a heat-resistant polymer to form the core comprising a polymer that has the same or different composition as the polymer matrix, and electrospray coating the core or solution dipping the core to form the shell comprising the proton-conducting inorganic material; and
  heat pressing the nanofibers to form the membrane.

Embodiment 121 provides the method of Embodiment 120, wherein the heat pressing comprises heat pressing the nanofibers with a heat-resistant polymer.

Embodiment 122 provides the method of any one of Embodiments 120-121, further comprising aligning the nanofibers perpendicular to a plane of the membrane before the heat pressing.

Embodiment 123 provides a method of making the membrane of any one of Embodiments 1-109, the method comprising:
  combining a polymer solution and particles comprising the proton-conducting material to form a mixture;
  drying the mixture;
  pulverizing the dried mixture;
  optionally further processing the dried mixture comprising adding a polymer solution to the dried mixture, drying the resulting mixture, and pulverizing the resulting dried mixture;
  adding a solvent to the dried mixture to form a dough; and
  pressing the dough to form the membrane.

Embodiment 124 provides a method of making the membrane of any one of Embodiments 1-109, the method comprising:
  combining a polymer solution and a suspension of particles comprising the proton-conducting material to form a mixture;
  applying the mixture to a flat surface; and drying the mixture on the flat surface to form the membrane.

Embodiment 125 provides a method of making the membrane of any one of Embodiments 1-109, the method comprising:
combining a polymer solution and a suspension of particles comprising the proton-conducting material to form a mixture;
electrospinning the mixture to form polymer fibers comprising particles therein, the particles comprising the proton-conducting material; and
heat pressing the polymer fibers into a mat, to form the membrane.

Embodiment 126 provides a method of forming ammonia using the membrane of any one of Embodiments 1-109, the method comprising:
generating ammonia from a cathode of an ammonia-production cell, the ammonia-production cell comprising
an anode,
the cathode, and
a membrane separating the anode and the cathode, the membrane comprising the membrane of any one of Embodiments 1-109.

Embodiment 127 provides the method of Embodiment 126, wherein the ammonia is generated with the membrane at a temperature of about 200° C. to about 450° C.

Embodiment 128 provides a method of water electrolysis using the membrane of any one of Embodiments 1-109, the method comprising:
generating hydrogen from a cathode of an electrolysis cell, the electrolysis cell comprising
an anode,
the cathode, and
a membrane separating the anode and the cathode, the membrane comprising the membrane of any one of Embodiments 1-109.

Embodiment 129 provides the method of Embodiment 128, wherein the hydrogen is generated with the membrane at a temperature of about 200° C. to about 450° C.

Embodiment 130 provides a method of operating an electrochemical cell comprising the membrane of any one of Embodiments 1-109, the method comprising:
generating an electrical potential between an anode and a cathode of the electrochemical cell, the electrochemical cell comprising
the anode,
the cathode, and
a membrane separating the anode and the cathode, the membrane comprising the membrane of any one of Embodiments 1-109.

Embodiment 131 provides the method of Embodiment 130, wherein the potential is generated between the anode and the cathode with the membrane at a temperature of about 150° C. to about 450° C.

Embodiment 132 provides the method of any one of Embodiments 130-131, wherein the electrochemical cell is a fuel cell.

Embodiment 133 provides the membrane, method, apparatus, or electrochemical cell of any one or any combination of Embodiments 1-132 optionally configured such that all elements or options recited are available to use or select from.

What is claimed is:

1. A proton-exchange membrane comprising:
a polymer matrix, polymer fibers, or a combination thereof; and
a proton-conducting material distributed in the polymer matrix, on the polymer fibers, in the polymer fibers, or a combination thereof, wherein the proton-conducting material comprises an alkali thio-hydroxo metal, an alkali thio-hydroxo metalloid, a pyrophosphate, an ultraphosphate, or a combination thereof.

2. The membrane of claim 1, wherein the membrane comprises particles of the proton-conducting material.

3. The membrane of claim 1, wherein the membrane comprises the polymer fibers with the proton-conducting material distributed on the polymer fibers, in the polymer fibers, or a combination thereof.

4. The membrane of claim 1, wherein the membrane comprises the polymer matrix with the proton-conducting material distributed in the polymer matrix.

5. The membrane of claim 4, wherein the proton-conducting material comprises proton-conducting nanofibers.

6. The membrane of claim 1, wherein the proton-conducting material comprises cesium thio-hydroxogermanate (CTHG), cerium ultraphosphate, cesium ultraphosphate, or a combination thereof.

7. The membrane of claim 1, comprising:
the polymer matrix comprising polybenzimidazole (PBI); and
proton-conducting nanofibers distributed in the polymer matrix, each nanofiber comprising
a core that is continuous along a length of the nanofiber and that comprises the proton-conducting material, and
a shell that is continuous along the length of the nanofiber, the shell comprising polybenzimidazole (PBI).

8. The membrane of claim 1, comprising:
the polymer matrix comprising polybenzimidazole (PBI); and
particles comprising the proton-conducting material homogeneously distributed in the polymer matrix.

9. The membrane of claim 1, comprising:
the polymer fibers comprising polybenzimidazole (PBI); and
the proton-conducting material distributed on the polymer fibers, in the polymer fibers, or a combination thereof;
wherein the polymer fibers having the proton-conducting material thereon are matted together in an orientation that is substantially parallel to a plane of the membrane.

10. An ammonia-forming apparatus or a water-electrolysis apparatus comprising the membrane of claim 1.

11. An electrochemical cell comprising:
an anode;
a cathode; and
a membrane separating the anode and the cathode, the membrane comprising the membrane of claim 1.

12. A method of using the membrane of claim 1, the method comprising:
conducting protons from one major face of the membrane to another major face with a conductivity of $10^{-6}$ S/cm to about $10^{-1}$ S/cm while the membrane is at a temperature of $\geq 200$ to $\leq 450°$ C.

13. A method of making the membrane of claim 1, the method comprising:
combining a polymer solution and a suspension of particles comprising the proton-conducting material to form a mixture;
applying the mixture to a flat surface; and
drying the mixture on the flat surface to form the membrane.

14. A method of water electrolysis or of forming ammonia using the membrane of claim 1, the method comprising:
generating hydrogen from a cathode of an electrolysis cell, or generating ammonia from a cathode of an ammonia-production cell, the electrolysis cell or ammonia-production cell comprising
an anode,
the cathode, and
a membrane separating the anode and the cathode, the membrane comprising the membrane of claim 1.

15. A method of operating an electrochemical cell comprising the membrane of claim 1, the method comprising:
generating an electrical potential between an anode and a cathode of the electrochemical cell, the electrochemical cell comprising
the anode,
the cathode, and
a membrane separating the anode and the cathode, the membrane comprising the membrane of claim 1.

16. A method of making a proton-exchange membrane, the method comprising:
forming core-shell nanofibers comprising a core and shell, the forming comprising electrospinning a polymer to form the core comprising a polymer and electrospray coating the core or solution dipping the core to form the shell comprising a proton-conducting material, or the forming comprising co-electrospinning a solution comprising the proton-conducting material and a solution comprising the polymer to form the core that comprises the proton-conducting material and the shell that comprises a polymer; and
heat pressing the nanofibers to form the membrane, wherein the membrane comprises
the nanofibers; and
the proton-conducting material distributed on the nanofibers, in the nanofibers, or a combination thereof.

17. A method of making a proton-exchange membrane, the method comprising:
combining a polymer solution and particles comprising a proton-conducting material to form a mixture;
drying the mixture;
pulverizing the dried mixture;
optionally further processing the dried mixture comprising adding a polymer solution to the dried mixture, drying the resulting mixture, and pulverizing the resulting dried mixture;
adding a solvent to the dried mixture to form a dough; and
pressing the dough to form the membrane, wherein the membrane comprises
a polymer matrix, polymer fibers, or a combination thereof, and
the proton-conducting material distributed in the polymer matrix, on the polymer fibers, in the polymer fibers, or a combination thereof.

18. A method of making a proton-exchange membrane, the method comprising:
combining a polymer solution and a suspension of particles comprising a proton-conducting material to form a mixture;
electrospinning the mixture to form polymer fibers comprising particles therein, the particles comprising the proton-conducting material; and
heat pressing the polymer fibers into a mat, to form the membrane, wherein the membrane comprises
the polymer fibers; and
a proton-conducting material distributed on the polymer fibers, in the polymer fibers, or a combination thereof.

* * * * *